United States Patent
Hoshino et al.

(10) Patent No.: US 11,525,031 B2
(45) Date of Patent: Dec. 13, 2022

(54) FLUORINATED ETHER COMPOUND, FLUORINATED ETHER COMPOSITION, COATING LIQUID, ARTICLE AND ITS PRODUCTION METHOD

(71) Applicant: AGC Inc., Chiyoda-ku (JP)

(72) Inventors: Taiki Hoshino, Chiyoda-ku (JP); Keigo Matsuura, Chiyoda-ku (JP); Makoto Uno, Chiyoda-ku (JP); Masahiro Ito, Chiyoda-ku (JP); Kenji Ishizeki, Chiyoda-ku (JP); Lilin Zhou, Chiyoda-ku (JP); Daisuke Kobayashi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/774,140

(22) Filed: Jan. 28, 2020

(65) Prior Publication Data

US 2020/0165384 A1 May 28, 2020

Related U.S. Application Data

(63) Continuation of application No. PCT/JP2018/029119, filed on Aug. 2, 2018.

(30) Foreign Application Priority Data

Aug. 22, 2017 (JP) .............................. JP2017-159696

(51) Int. Cl.
  *C08G 65/00* (2006.01)
  *C08G 65/336* (2006.01)
  *C09D 171/02* (2006.01)

(52) U.S. Cl.
  CPC ......... *C08G 65/007* (2013.01); *C08G 65/336* (2013.01); *C09D 171/02* (2013.01)

(58) Field of Classification Search
  None
  See application file for complete search history.

(56) References Cited

U.S. PATENT DOCUMENTS 3,950,588 A * 4/1976 McDougal ............... A47J 36/04
  442/80
10,829,666 B2 * 11/2020 Hoshino ............... C07F 7/1804
2009/0208728 A1 * 8/2009 Itami .................... C08G 65/336
  428/318.4
2012/0270057 A1 * 10/2012 Yamane ................ C09D 5/006
  428/429
2016/0304665 A1   10/2016 Sakoh et al.
2018/0148606 A1 * 5/2018 Hoshino ............... C07F 7/1804
2019/0233587 A1 * 8/2019 Ishizeki .................. C09K 3/18
2020/0115589 A1 * 4/2020 Hoshino ............... C08F 259/08
2020/0157376 A1 * 5/2020 Hoshino ............... C08G 65/337

FOREIGN PATENT DOCUMENTS

| EP | 3569673 A1 * | 11/2019 | ........... C08G 65/325 |
| JP | 09326240 A * | 12/1997 | |
| JP | 2016-204656 A | 12/2016 | |
| JP | 2018111816 A * | 7/2018 | .............. C08L 71/00 |
| WO | WO-2017038830 A1 * | 3/2017 | ........... C08G 65/329 |
| WO | WO 2017/187775 A1 | 11/2017 | |
| WO | WO-2018043166 A1 * | 3/2018 | ....... C08G 65/33306 |
| WO | WO 2018/151055 A1 | 8/2018 | |

OTHER PUBLICATIONS

Machine translation of JP 09326240 A, retrieved Jul. 2021 (Year: 2021).*
Taki Hoshino et al., U.S. Appl. No. 16/715,155, filed Dec. 16, 2019 (Year: 2020).*
International Search Report dated Oct. 9, 2018 in PCT/JP2018/029119 filed Aug. 2, 2018.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A fluorinated ether compound represented by A-O—$(R^{f1}O)_m$—$R^{f2}$—$[C(O)N(R^1)]_p$-$Q^1$-$C(R^2)$[-$Q^2$-$SiR^3{}_n L_{3-n}]_2$, wherein A is a $C_{1-20}$ perfluoroalkyl group, $R^{f1}$ is a linear fluoroalkylene group, m is an integer of from 2 to 500, $R^{f2}$ is a linear fluoroalkylene group, $R^1$ is a hydrogen atom or an alkyl group, p is 0 or 1, $Q^1$ is a single bond or an alkylene group, $R^2$ is a hydrogen atom, a monovalent hydrocarbon group or the like, $Q^2$ is an alkylene group, $R^3$ is a hydrogen atom or a monovalent hydrocarbon group, L is a hydrolyzable group, and n is an integer of from 0 to 2 is provided. A fluorinated ether composition and a coating liquid capable of forming a surface layer excellent in initial water/oil repellency, fingerprint stain removability, abrasion resistance, light resistance and chemical resistance, an article having a surface layer, and a method for producing it are also provided.

11 Claims, No Drawings

FLUORINATED ETHER COMPOUND, FLUORINATED ETHER COMPOSITION, COATING LIQUID, ARTICLE AND ITS PRODUCTION METHOD

This application is a continuation of PCT Application No. PCT/JP2018/029119, filed on Aug. 2, 2018, which is based upon and claims the benefit of priority from Japanese Patent Application No. 2017-159696 filed on Aug. 22, 2017. The contents of those applications are incorporated herein by reference in their entireties.

TECHNICAL FIELD

The present invention relates to a fluorinated ether compound, a fluorinated ether composition, a coating liquid, an article and its production method.

BACKGROUND ART

A fluorinated ether compound having a poly(oxyperfluoroalkylene) chain is capable of forming on a surface of a substrate a surface layer having high lubricity, water/oil repellency, etc. and thus is suitably used for a surface treatment agent. A surface treatment agent containing the fluorinated ether compound is used in an application where it is desired to maintain, for a long period of time, a performance (abrasion resistance) whereby water/oil repellency is less likely to be lowered even if the surface layer is rubbed repeatedly with fingers, and a performance (fingerprint stain removability) whereby a fingerprint adhering to the surface layer can be readily removed by wiping, for example, as a surface treatment agent for a member constituting a plane of a touch panel to be touched with fingers, a spectacle lens, a display of a wearable terminal, etc.

As a fluorinated ether compound which is capable of forming on a surface of a substrate a surface layer excellent in abrasion resistance and fingerprint stain removability, the following has been proposed.

A fluorinated ether compound which has a poly(oxyperfluoroalkylene) chain and three hydrolyzable silyl groups introduced to one terminal of the chain via a branch by a carbon atom (Patent Document 1).

PRIOR ART DOCUMENTS

Patent Document

Patent Document 1: JP-A-2016-204656

DISCLOSURE OF INVENTION

Technical Problem

However, the fluorinated ether compound disclosed in Patent Document 1 has an etheric oxygen atom in a linking group between the poly(oxyperfluoroalkylene) chain and the hydrolyzable silyl group, and ether bond of the linking group is likely to be cleaved by light or chemicals, and thus the fluorinated ether compound is insufficient in light resistance and chemical resistance. Further, in recent years, a surface layer of e.g. a member constituting a surface to be touched with fingers of a touch panel is required to have further improved abrasion resistance. Accordingly, a fluorinated ether compound capable of forming a surface layer more excellent in abrasion resistance may sometimes be required.

An object of the present invention is to provide a fluorinated ether compound capable of forming a surface layer excellent in initial water/oil repellency, fingerprint stain removability, abrasion resistance, light resistance and chemical resistance; a fluorinated ether composition and a coating liquid containing the fluorinated ether compound; an article having a surface layer excellent in initial water/oil repellency, fingerprint stain removability, abrasion resistance, light resistance and chemical resistance, and a method for producing it.

Another object of the present invention is to provide a fluorinated ether compound useful as an intermediate of a fluorinated ether compound suitably used for a surface treatment agent.

Solution to Problem

The present invention provides a fluorinated ether compound, a fluorinated ether composition, a coating liquid, an article, a method for producing an article, and a fluorinated ether compound according to another embodiment, having the following constructions [1] to [15].

[1] A fluorinated ether compound, which is a compound represented by the following formula 1:

$A^1$-O—$(R^{f1}O)_m$—$B^1$      formula 1 wherein $A^1$ is a $C_{1-20}$ perfluoroalkyl group or $B^1$, $R^{f1}$ is a linear fluoroalkylene group, m is an integer of from 2 to 500, $(R^{f1}O)_m$ may consist of two or more types of $R^{f1}O$ differing in the number of carbon atoms, $B^1$ is a group represented by the following formula 1-1:

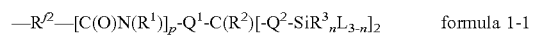

—$R^{f2}$—$[C(O)N(R^1)]_p$-$Q^1$-$C(R^2)$[-$Q^2$-$SiR^3{}_nL_{3-n}]_2$      formula 1-1

$R^{f2}$ is a linear fluoroalkylene group (provided that to a carbon atom at the terminal on the $[C(O)N(R^1)]_p$ side, at least one fluorine atom is bonded), $R^1$ is a hydrogen atom or an alkyl group, p is 0 or 1, $Q^1$ is a single bond or an alkylene group, $R^2$ is a hydrogen atom, a monovalent hydrocarbon group, or a monovalent hydrocarbon group in which one or more hydrogen atoms are substituted by a halogen atom, $Q^2$ is an alkylene group, $R^3$ is a hydrogen atom or a monovalent hydrocarbon group, L is a hydrolyzable group, n is an integer of from 0 to 2, and the two [-$Q^2$-$SiR^3{}_nL_{3-n}$] may be the same or different.

[2] The fluorinated ether compound according to [1], wherein the compound represented by the formula 1 is a compound represented by the following formula 10:

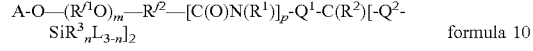

A-O—$(R^{f1}O)_m$—$R^{f2}$—$[C(O)N(R^1)]_p$-$Q^1$-$C(R^2)$[-$Q^2$-$SiR^3{}_nL_{3-n}]_2$      formula 10 wherein A is a $C_{1-20}$ perfluoroalkyl group.

[3] The fluorinated ether compound according to [1] or [2], wherein in the group represented by the formula 1-1, —$R^{f2}$—$[C(O)N(R^1)]_p$-$Q^1$- is a group represented by the following formula g1, g2, g3 or g4:

—$(CF_2)_q$—$C(O)N(R^1)$—$(CH_2)_r$—      formula g1

—$(CF_2)_q$—$CH_2CHX$—$(CH_2)_r$—      formula g2

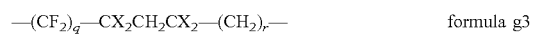

—$(CF_2)_q$—$CX_2CH_2CX_2$—$(CH_2)_r$—      formula g3

—$(CF_2)_q$—$CX_2$—$(CH_2)_r$—      formula g4 wherein X is a hydrogen atom or a fluorine atom, all the four X in the formula g3 are the same atom, all the two X in the formula g4 are the same atom, q is an integer of from 1 to 5, and r is an integer of from 0 to 2.

[4] The fluorinated ether compound according to any one of [1] to [3], wherein the compound represented by the formula 1 is a compound represented by the following formula 11, 12, 13 or 14:

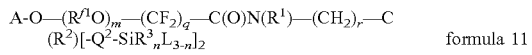

formula 11

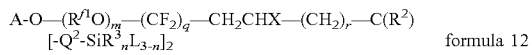

formula 12

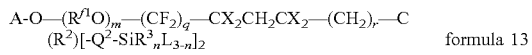

formula 13

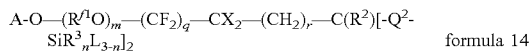

formula 14 wherein A is a $C_{1-20}$ perfluoroalkyl group, X is a hydrogen atom or a fluorine atom, all the four X in the formula 13 are the same atom, all the two X in the formula 14 are the same atom, q is an integer of from 1 to 5, and r is an integer of from 0 to 2.

[5] The fluorinated ether compound according to any one of [1] to [4], wherein $R^{f1}$ is a perfluoroalkylene group.

[6] A fluorinated ether composition comprising at least one type of the fluorinated ether compound as defined in any one of [1] to [5], and other fluorinated ether compound.

[7] A coating liquid comprising the fluorinated ether compound as defined in any one of [1] to [5] or the fluorinated ether composition as defined in [6], and a liquid medium.

[8] An article comprising a substrate and a surface layer formed of the fluorinated ether compound as defined in any one of [1] to [5] or the fluorinated ether composition as defined in [6] on a surface of the substrate.

[9] The article according to [8], which has the surface layer on a surface of a member constituting a plane to be touched with fingers of a touch panel.

[10] A method for producing an article, which comprises treating a surface of a substrate by dry coating method using the fluorinated ether compound as defined in any one of [1] to [5] or the fluorinated ether composition as defined in [6] to form a surface layer formed of the fluorinated ether compound or the fluorinated ether composition on the surface of the substrate.

[11] A method for producing an article, which comprises applying the coating liquid as defined in [7] to a surface of a substrate by wet coating film, followed by drying to form a surface layer formed of the fluorinated ether compound or the fluorinated ether composition on the surface of the substrate.

[12] A fluorinated ether compound, which is a compound represented by the following formula 2:

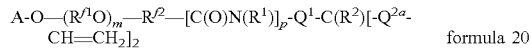

formula 2 wherein $A^2$ is a $C_{1-20}$ perfluoroalkyl group or $B^2$, $R^{f1}$ is a linear fluoroalkylene group, m is an integer of from 2 to 500, $(R^{f1}O)_m$ may consist of two or more types of $R^{f1}O$ differing in the number of carbon atoms, $B^2$ is a group represented by the following formula 2-1:

formula 2-1

$R^{f2}$ is a linear fluoroalkylene group (provided that to a carbon atom at the terminal on the $[C(O)N(R^1)]_p$ side, at least one fluorine atom is bonded), $R^1$ is a hydrogen atom or an alkyl group, p is 0 or 1, $Q^1$ is a single bond or an alkylene group, $R^2$ is a hydrogen atom, a monovalent hydrocarbon group, or a monovalent hydrocarbon group in which one or more hydrogen atoms are substituted by a halogen atom, $Q^{2a}$ is a single bond or an alkylene group, and the two $[-Q^{2a}-CH=CH_2]$ may be the same or different.

[13] The fluorinated ether compound according to [12], wherein the compound represented by the formula 2 is a compound represented by the following formula 20:

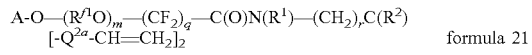

formula 20 wherein A is a $C_{1-20}$ perfluoroalkyl group.

[14] The fluorinated ether compound according to [12] or [13], wherein the compound represented by the formula 2 is a compound represented by the following formula 21, 22, 23 or 24:

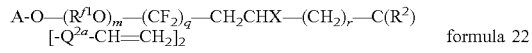

formula 21

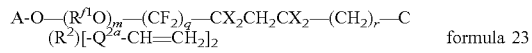

formula 22

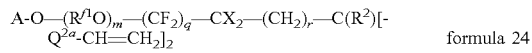

formula 23

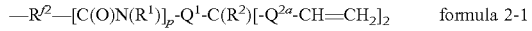

formula 24 wherein A is a $C_{1-20}$ perfluoroalkyl group, X is a hydrogen atom or a fluorine atom, all the four X in the formula 23 are the same atom, all the two X in the formula 24 are the same atom, q is an integer of from 1 to 5, and r is an integer of from 0 to 2.

[15] The fluorinated ether compound according to any one of [12] to [14], wherein $R^{f1}$ is a perfluoroalkylene group.

Advantageous Effects of Invention

By the fluorinated ether compound of the present invention, it is possible to form a surface layer excellent in initial water/oil repellency, fingerprint stain removability, abrasion resistance, light resistance and chemical resistance.

By the fluorinated ether composition of the present invention, it is possible to form a surface layer excellent in initial water/oil repellency, fingerprint stain removability, abrasion resistance, light resistance and chemical resistance.

By the coating liquid of the present invention, it is possible to form a surface layer excellent in initial water/oil repellency, fingerprint stain removability, abrasion resistance, light resistance and chemical resistance.

The article of the present invention has a surface layer excellent in initial water/oil repellency, fingerprint stain removability, abrasion resistance, light resistance and chemical resistance.

According to the method for producing an article of the present invention, it is possible to produce an article having a surface layer excellent in initial water/oil repellency, fingerprint stain removability, abrasion resistance, light resistance and chemical resistance.

According to another embodiment, the fluorinated ether compound of the present invention is useful as an intermediate of the fluorinated ether compound suitably used for a surface treatment agent.

DESCRIPTION OF EMBODIMENTS

In this specification, a compound represented by the formula 1 will be referred to as compound 1. Compounds represented by other formulae will be referred to in the same manner.

Further, a group represented by the formula g1 will be referred to as group g1. Groups represented by other formulae will be referred to in the same manner.

In this specification, meanings of the following terms are as follows.

An "etheric oxygen atom" means an oxygen atom forming an ether bond (—O—) between carbon atoms.

The chemical formula of the oxyfluoroalkylene unit is represented so that its oxygen atom is described on the right-side of the fluoroalkylene group.

A "hydrolyzable silyl group" means a group capable of forming a silanol group (Si—OH) by being hydrolyzed, and is $SiR^3_nL_{3-n}$ in the formula 1.

A "surface layer" means a layer formed on the surface of a substrate.

The "number average molecular weight" of the fluorinated ether compound is calculated by obtaining the number (average value) of oxyperfluoroalkylene groups on the basis of the terminal group, by $^1$H-NMR and $^{19}$F-NMR. The terminal group may, for example, be A or $SiR^3_nL_{3-n}$ as $B^1$ in the formula 1.

[Fluorinated Ether Compound]

The fluorinated ether compound of the present invention is compound 1, preferably the after-described compound 10.

$$A^1\text{-}O\text{—}(R^{f1}O)_m\text{—}B^1 \qquad \text{formula 1}$$

$$\text{—}R^{f2}\text{—}[C(O)N(R^1)]_p\text{-}Q^1\text{-}C(R^2)[\text{-}Q^2\text{-}SiR^3_nL_{3-n}]_2 \qquad \text{formula 1-1}$$

wherein $A^1$ is a $C_{1-20}$ perfluoroalkyl group or $B^1$, $R^{f1}$ is a linear fluoroalkylene group, m is an integer of from 2 to 500, $(R^{f1}O)_m$ may consist of two or more types of $R^{f1}O$ differing in the number of carbon atoms, $B^1$ is the group 1-1, $R^{f2}$ is a linear fluoroalkylene group (provided that to a carbon atom at the terminal on the $[C(O)N(R^1)]_p$ side, at least one fluorine atom is bonded), $R^1$ is a hydrogen atom or an alkyl group, p is 0 or 1, $Q^1$ is a single bond or an alkylene group, $R^2$ is a hydrogen atom, a monovalent hydrocarbon group, or a monovalent hydrocarbon group in which one or more hydrogen atoms are substituted by a halogen atom, $Q^2$ is an alkylene group, $R^3$ is a hydrogen atom or a monovalent hydrocarbon group, L is a hydrolyzable group, n is an integer of from 0 to 2, and the two $[-Q^2-SiR^3_nL_{3-n}]$ may be the same or different.

$A^1$ is preferably a $C_{1-20}$ perfluoroalkyl group, and accordingly preferred as the compound 1 is a compound represented by the following formula 10, that is compound 10.

$$A\text{-}O\text{—}(R^{f1}O)_m\text{—}R^{f2}\text{—}[C(O)N(R^1)]_p\text{-}Q^1\text{-}C(R^2)[\text{-}Q^2\text{-}SiR^3_nL_{3-n}]_2 \qquad \text{formula 10}$$

wherein A is a $C_{1-20}$ perfluoroalkyl group, and $R^{f1}$, m, $R^{f2}$, $R^1$, p, $Q^1$, $R^2$, $Q^2$, $R^3$ and n are as defined for the compound 1.

The number of carbon atoms in $A^1$ and A which is a $C_{1-20}$ perfluoroalkyl group is preferably from 1 to 10, more preferably from 1 to 6, particularly preferably from 1 to 3, whereby the surface layer formed of the compound 1 or the compound 10 will be more excellent in lubricity and abrasion resistance.

The number of carbon atoms in $R^{f1}$ is preferably from 1 to 6, in view of more excellent abrasion resistance and fingerprint stain removability of the surface layer.

$R^{f1}$ is preferably a perfluoroalkylene group in view of more excellent abrasion resistance and lubricity of the surface layer. $R^{f1}$ other than the perfluoroalkylene group is preferably a $C_{2-6}$ polyfluoroalkylene group having from 1 to 4 hydrogen atoms and at least two fluorine atoms, more preferably a $C_{2-6}$ polyfluoroalkylene group having one or two hydrogen atoms and at least two fluorine atoms.

The proportion of the perfluoroalkylene group to the entire $R^{f1}$ is preferably at least 60 mol %, more preferably at least 80 mol %, particularly preferably 100 mol %, in view of more excellent abrasion resistance and lubricity of the surface layer.

m is preferably an integer of from 2 to 200, more preferably an integer of from 5 to 150, particularly preferably an integer of from 10 to 100. When m is at least the lower limit value of the above range, the surface layer will be more excellent in water/oil repellency. When m is at most the upper limit value of the above range, the surface layer will be more excellent in abrasion resistance. That is, if the number average molecular weight of the compound 1 is too high, the number of hydrolyzable silyl groups present per unit molecular weight decreases, and the abrasion resistance of the surface layer will be lowered.

In $(R^{f1}O)_m$, when at least two types of $R^{f1}O$ are present, the bonding order of the respective $R^{f1}O$ is not limited. For example, when $CF_2O$ and $CF_2CF_2O$ are present, such $CF_2O$ and $CF_2CF_2O$ may be arranged randomly, alternately or in block.

At least two types of $R^{f1}O$ being present is meant that at least two types of $R^{f1}O$ differing in the number of carbon atoms are present, at least two types of $R^{f1}O$ differing in the number of hydrogen atoms are present, and at least two types of $R^{f1}O$ differing in the positions of hydrogen atoms are present.

With respect to arrangement of at least two types of $R^{f1}O$, for example, a structure represented by $\{(CF_2O)_{m1}(CF_2CF_2O)_{m2}\}$ indicates that m1 pieces of $(CF_2O)$ and m2 pieces of $(CF_2CF_2O)$ are randomly arranged. Further, a structure represented by $(CF_2CF_2O-CF_2CF_2CF_2CF_2O)_{m5}$ indicates that m5 pieces of $(CF_2CF_2O)$ and m5 pieces of $(CF_2CF_2CF_2CF_2O)$ are alternately arranged.

As $(R^{f1}O)_m$, preferred is $(R^{f1}O)_m$ having the following structure in at least a part thereof.

$\{(CF_2O)_{m1}(CF_2CF_2O)_{m2}\}$
$(CF_2CF_2O)_{m3}$
$(CF_2CF_2CF_2O)_{m4}$
$(CF_2CF_2O-CF_2CF_2CF_2CF_2O)_{m5}$
$(CF_2CF_2CF_2CF_2CF_2O)_{m6}(CF_2O)_{m7}$
$(CF_2CF_2CF_2CF_2CF_2O)_{m6}(CF_2CF_2O)_{m7}$
$(CF_2CF_2CF_2CF_2CF_2O)_{m6}(CF_2O)_{m7}$
$(CF_2CF_2CF_2CF_2CF_2O)_{m6}(CF_2CF_2O)_{m7}$
$(CF_2CF_2CF_2CF_2CF_2O-CF_2O)_{m8}$
$(CF_2CF_2CF_2CF_2CF_2O-CF_2CF_2O)_{m8}$
$(CF_2CF_2CF_2CF_2CF_2CF_2O-CF_2O)_{m8}$
$(CF_2CF_2CF_2CF_2CF_2CF_2O-CF_2CF_2O)_{m8}$
$(CF_2O-CF_2CF_2CF_2CF_2CF_2O)_{m8}$
$(CF_2O-CF_2CF_2CF_2CF_2CF_2CF_2O)_{m8}$
$(CF_2CF_2O-CF_2CF_2CF_2CF_2O)_{m8}$
$(CF_2CF_2O-CF_2CF_2CF_2CF_2CF_2CF_2O)_{m8}$ wherein m1 is an integer of at least 1, m2 is an integer of at least 1, m1+m2 is an integer of from 2 to 500, m3 and m4 are each an integer of from 2 to 500, m5 is an integer of from 1 to 250, m6 and m7 are each an integer of at least 1, m6+m7 is an integer of from 2 to 500, and m8 is an integer of from 1 to 250.

$(R^{f1}O)_m$ is preferably as follows, in view of easy production of the compound 1.

$\{(CF_2O)_{m1}(CF_2CF_2O)_{m2}\}$
$(CF_2CF_2O)_2\{(CF_2O)_{m1}(CF_2CF_2O)_{m2-2}\}$
$(CF_2CF_2CF_2O)_{m4}$
$(CF_2CF_2O-CF_2CF_2CF_2CF_2O)_{m5-1}CF_2CF_2O$
$(CF_2CF_2CF_2CF_2CF_2O-CF_2O)_{m8}$ $(CF_2CF_2CF_2CF_2CF_2CF_2O\!-\!CF_2O)_{m8}$
$(CF_2CF_2O\!-\!CF_2CF_2CF_2CF_2CF_2O)_{m8\text{-}1}CF_2CF_2O$
$(CF_2CF_2O\!-\!CF_2CF_2CF_2CF_2CF_2O)_{m8\text{-}1}CF_2CF_2O$
wherein m2, m5 and m8 are selected so that m2-2, m5-1 and m8-1 are an integer of at least 1.

The number of carbon atoms in $R^{f2}$ is preferably from 1 to 8, more preferably from 1 to 6, particularly preferably from 1 to 5, in view of more excellent abrasion resistance and fingerprint stain removability of the surface layer.

$R^{f2}$ is preferably a perfluoroalkylene group, in view of more excellent abrasion resistance and lubricity of the surface layer.

$R^1$ is preferably a hydrogen atom, in view of easy production of the compound 1. In a case where $R^1$ is an alkyl group, its number of carbon atoms is preferably from 1 to 4.

$Q^1$ is preferably a single bond or a $C_{1\text{-}10}$ alkylene group, particularly preferably a single bond or a $C_{1\text{-}4}$ alkylene group.

The structure of $-R^{f2}-[C(O)N(R^1)]_p-Q^1-$ depends on the method for preparing the compound 1. Accordingly, $-R^{f2}-[C(O)N(R^1)]_p-Q^1-$ has a structure corresponding to the after-described method for preparing compound 2 which is a precursor of the compound 1. For example, in the method for producing the compound 21, group g1 is formed, in the method for producing the compound 22, group g2 is formed, in the method for producing the compound 23, group g3 is formed, and in the method for producing the compound 24, group g4 is formed.

$-(CF_2)_q-C(O)N(R^1)-(CH_2)_r-$   formula g1

$-(CF_2)_q-CH_2CHX-(CH_2)_r-$   formula g2

$-(CF_2)_q-CX_2CH_2CX_2-(CH_2)_r-$   formula g3

$-(CF_2)_q-CX_2-(CH_2)_r-$   formula g4 wherein q is an integer of from 1 to 5, X is a hydrogen atom or a fluorine atom, r is an integer of from 0 to 2, all the four X in the formula g3 are the same atom, and all the two X in the formula g4 are the same atom.

The groups g2 to g4 may be the same group depending upon the selection of X, q and r in the formulae.

Further, in the groups g2 to g4, depending upon which X is selected, the boundary between a portion corresponding to $R^{f2}$ and a portion corresponding to $Q^1$ varies. That is, $CH_2CHX$ in the group g2, $CX_2CH_2CX_2$ in the group g3 and $CX_2$ in the group g4 belong to $Q^1$ when X is a hydrogen atom, and belong to $R^{f2}$ when X is a fluorine atom.

As the group g1, for example, the following groups may be mentioned.
$-(CF_2)_q-C(O)NH-$,
$-(CF_2)_q-C(O)N(CH_3)-$,
$-(CF_2)_q-C(O)NH-CH_2-$,
$-(CF_2)_q-C(O)N(CH_3)-CH_2-$,
$-(CF_2)_q-C(O)NH-CH_2CH_2-$,
$-(CF_2)_q-C(O)N(CH_3)-CH_2CH_2-$.

As the group g2, for example, the following groups may be mentioned.
$-(CF_2)_q-CH_2CH_2-$,
$-(CF_2)_q-CH_2CHF-$,
$-(CF_2)_q-CH_2CH_2-CH_2-$,
$-(CF_2)_q-CH_2CHF-CH_2-$,
$-(CF_2)_q-CH_2CH_2-CH_2CH_2-$,
$-(CF_2)_q-CH_2CHF-CH_2CH_2-$.

As the group g3, for example, the following groups may be mentioned.
$-(CF_2)_q-CH_2CH_2CH_2-$,
$-(CF_2)_q-CF_2CH_2CF_2-$,
$-(CF_2)_q-CH_2CH_2CH_2-CH_2-$,
$-(CF_2)_q-CF_2CH_2CF_2-CH_2-$.

As the group g4, for example, the following groups may be mentioned.
$-(CF_2)_q-CH_2-$,
$-(CF_2)_q-CF_2-$,
$-(CF_2)_q-CH_2-CH_2-$,
$-(CF_2)_q-CF_2-CH_2-$.

Hereinafter the compound 10 wherein $-R^{f2}-[C(O)N(R^1)]_p-Q^1-$ is the group g1 will be referred to as compound 11, the compound 10 wherein it is the group g2 as compound 12, the compound 10 wherein it is the group g3 as compound 13, and the compound 10 wherein it is the group g4 as compound 14.

$A-O-(R^{f1}O)_m-(CF_2)_q-C(O)N(R^1)-(CH_2)_r-C(R^2)[-Q^2-SiR^3_nL_{3-n}]_2$   formula 11

$A-O-(R^{f1}O)_m-(CF_2)_q-CH_2CHX-(CH_2)_r-C(R^2)[-Q^2-SiR^3_nL_{3-n}]_2$   formula 12

$A-O-(R^{f1}O)_m-(CF_2)_q-CX_2CH_2CX_2-(CH_2)_r-C(R^2)[-Q^2-SiR^3_nL_{3-n}]_2$   formula 13

$A-O-(R^{f1}O)_m-(CF_2)_q-CX_2-(CH_2)_r-C(R^2)[-Q^2-SiR^3_nL_{3-n}]_2$   formula 14

$(CF_2)_q$ is a group derived from $R^{f1}$. Accordingly, q is determined by the structure of $(R^{f1}O)_m$ and the method for preparing the compound 3 or the compound 4 described hereinafter, which is the raw material for the compounds 11 to 14. For example, q is 1 when $(R^{f1}O)_m$ is $\{(CF_2O)_{m1}(CF_2CF_2O)_{m2}\}$ or $(CF_2CF_2O)_{m3}$, q is 2 when $(R^{f1}O)_m$ is $(CF_2CF_2CF_2O)_{m4}$, q is 3 when $(R^{f1}O)_m$ is $(CF_2CF_2O-CF_2CF_2CF_2CF_2O)_{m5}$, q is 4 when $(R^{f1}O)_m$ is a combination of $CF_2O$ or $CF_2CF_2O$ and $CF_2CF_2CF_2CF_2CF_2O$, and q is 5 when $(R^{f1}O)_m$ is a combination of $CF_2O$ or $CF_2CF_2O$ and $CF_2CF_2CF_2CF_2CF_2CF_2O$.

In a case where $R^2$ is a monovalent hydrocarbon group or a monovalent hydrocarbon group in which one or more hydrogen atoms are substituted by a halogen atom, the number of carbon atoms in the monovalent hydrocarbon group is preferably from 1 to 20, more preferably from 1 to 10, particularly preferably from 1 to 4.

$R^2$ is preferably a hydrogen atom or a $C_{1\text{-}4}$ alkyl group, and in view of easy production of the compound 1, preferably a hydrogen atom.

The number of carbon atoms in $Q^2$ is preferably from 1 to 10, more preferably from 2 to 6, particularly preferably from 2 to 4.

$SiR^3_nL_{3-n}$ is a hydrolyzable silyl group.

The compound 1 has two hydrolyzable silyl groups at one terminal. The compound 1 having two hydrolyzable silyl groups at one terminal is firmly chemically bonded to a substrate, and is thereby capable of forming a surface layer excellent in abrasion resistance.

Further, the compound 10 has hydrolyzable silyl groups only at one terminal. The compound 10 having hydrolyzable silyl groups only at one terminal is less likely to aggregate, and is thereby capable of forming a surface layer excellent in outer appearance.

L is a hydrolyzable group. The hydrolyzable group is a group which becomes a hydroxy group by hydrolysis reaction. That is, Si-L at the terminal of the compound 1 becomes a silanol group (Si—OH) by hydrolysis reaction.

Silanol groups will further be intermolecularly reacted to form Si—O—Si bonds. Further, a silanol group will undergo dehydration condensation reaction with a hydroxy group (substrate-OH) on the surface of a substrate, to form a chemical bond (substrate-O—Si).

L may, for example, be an alkoxy group, a halogen atom, an acyl group, an acyloxy group or an isocyanate group. The alkoxy group is preferably a $C_{1-4}$ alkoxy group. The halogen atom is preferably a chlorine atom.

L is, in view of easy production of the compound 1, preferably an alkoxy group or a halogen atom. L is, since outgassing during application will be less, and storage stability of the compound 1 will be excellent, preferably a $C_{1-4}$ alkoxy group, and in a case where long term storage stability of the compound 1 is required, particularly preferably an ethoxy group, and in a case where the reaction time after coating should be short, particularly preferably a methoxy group.

$R^3$ is a hydrogen atom or a monovalent hydrocarbon group. The monovalent hydrocarbon group may, for example, be an alkyl group, a cycloalkyl group, an alkenyl group or an allyl group.

$R^3$ is preferably a monovalent hydrocarbon group, particularly preferably a monovalent saturated hydrocarbon group. The number of carbon atoms in the monovalent saturated hydrocarbon group is preferably from 1 to 6, more preferably from 1 to 3, particularly preferably from 1 to 2. When the number of carbon atoms in $R^3$ is within such a range, the compound 1 is likely to be produced.

n is preferably 0 or 1, particularly preferably 0. By the presence of a plurality of L in one hydrolyzable silyl group, bonding to the substrate will be more firm.

$SiR^3{}_nL_{3-n}$ is preferably $Si(OCH_3)_3$, $SiCH_3(OCH_3)_2$, $Si(OCH_2CH_3)_3$, $SiCl_3$, $Si(OCOCH_3)_3$ or $Si(NCO)_3$. In view of handling efficiency in industrial production, $Si(OCH_3)_3$ is particularly preferred.

The plurality of $SiR^3{}_nL_{3-n}$ in the compound 1 may be the same or different. From the production efficiency of the compound 1, they are preferably the same group.

As the compounds 11 to 14, for example, compounds of the following formulae are preferred. Such compounds are preferred from such a viewpoint that they are industrially easy to manufacture and easy to handle, and they provide a surface layer further excellent in water/oil repellency, abrasion resistance, fingerprint stain removability, lubricity, chemical resistance, light resistance and chemical resistance.

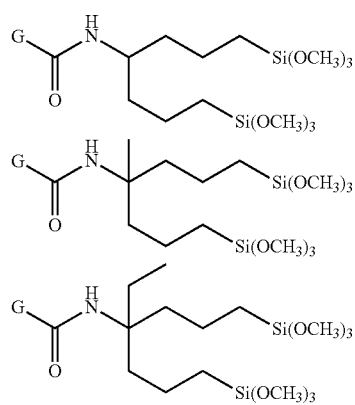

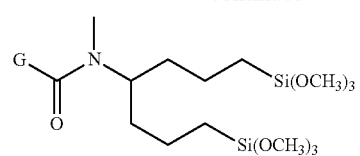

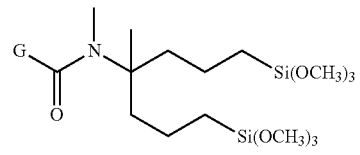

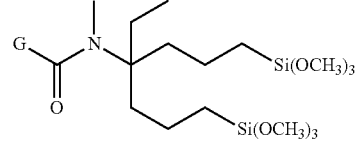

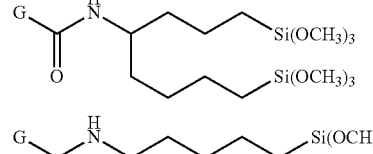

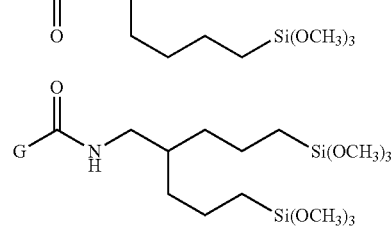

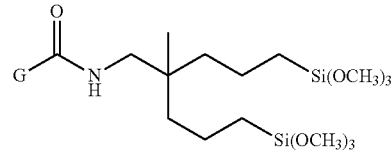

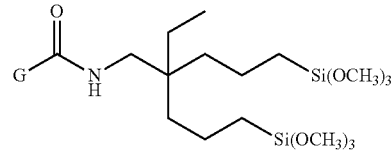

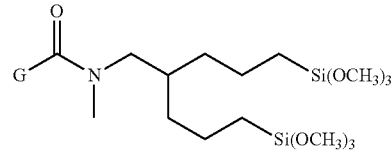

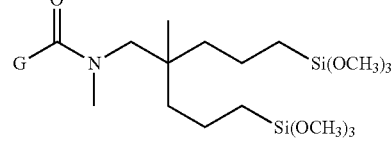

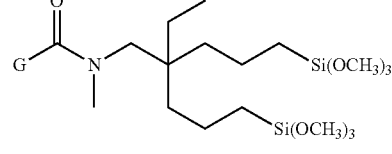

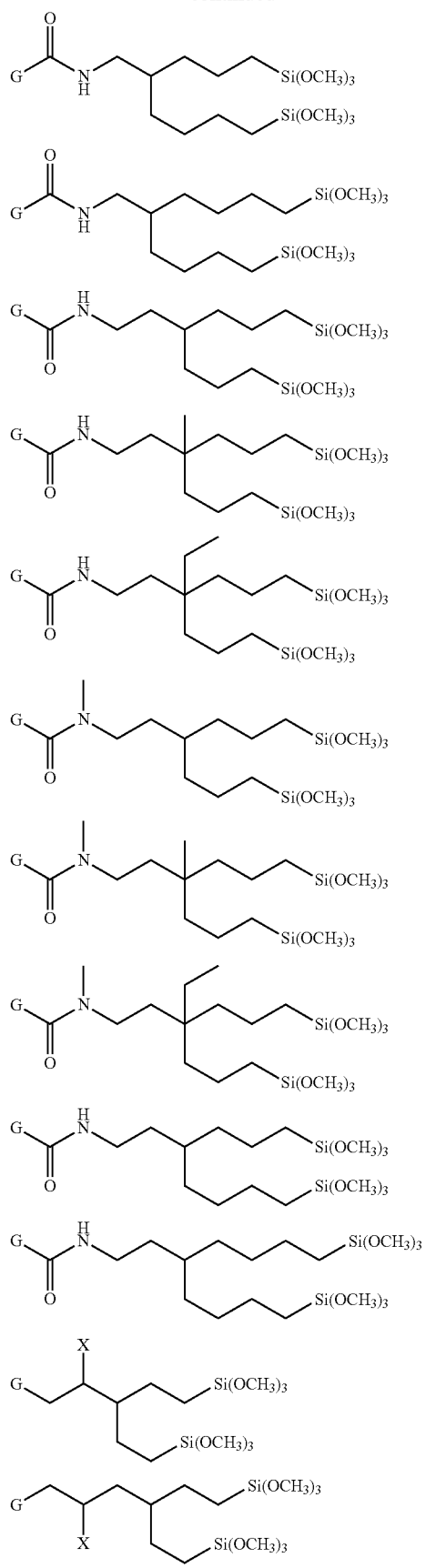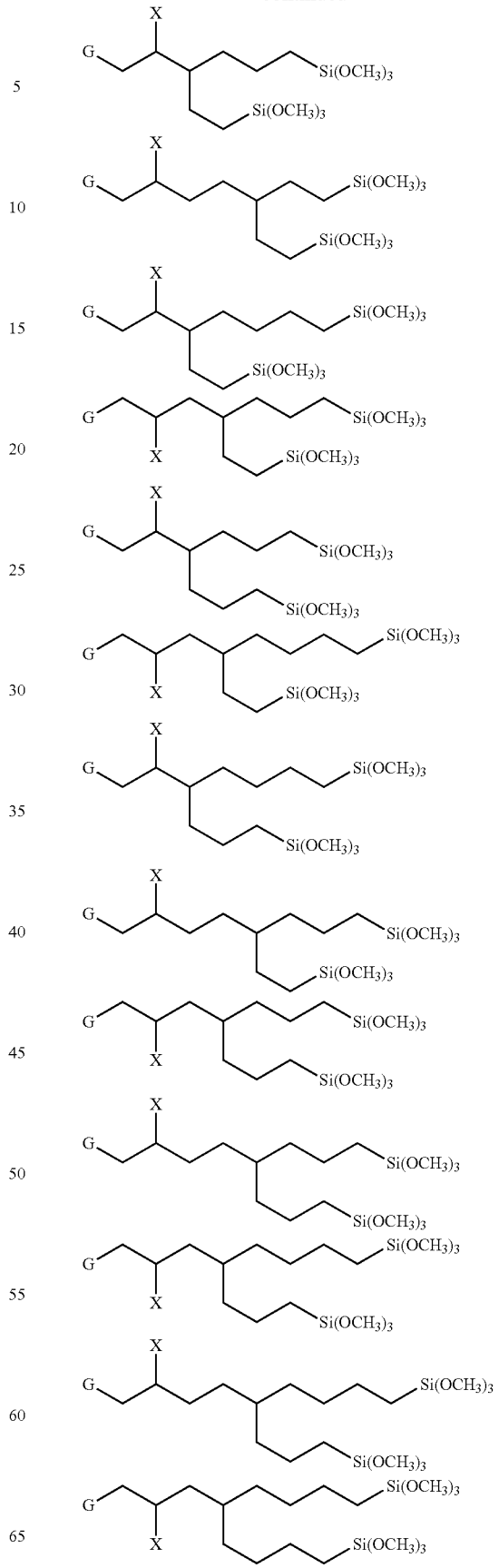

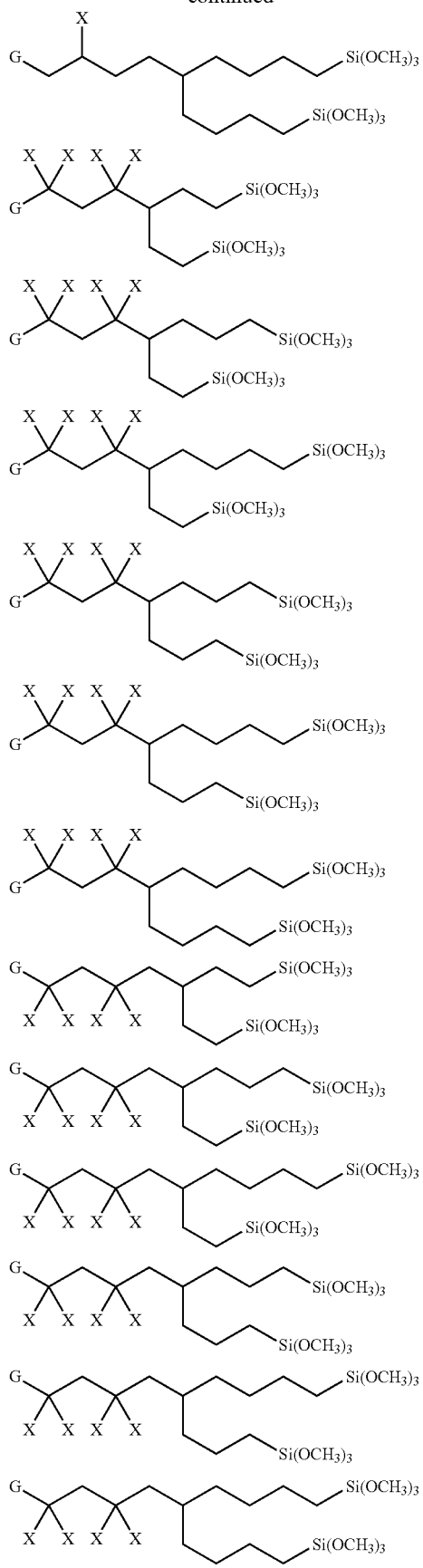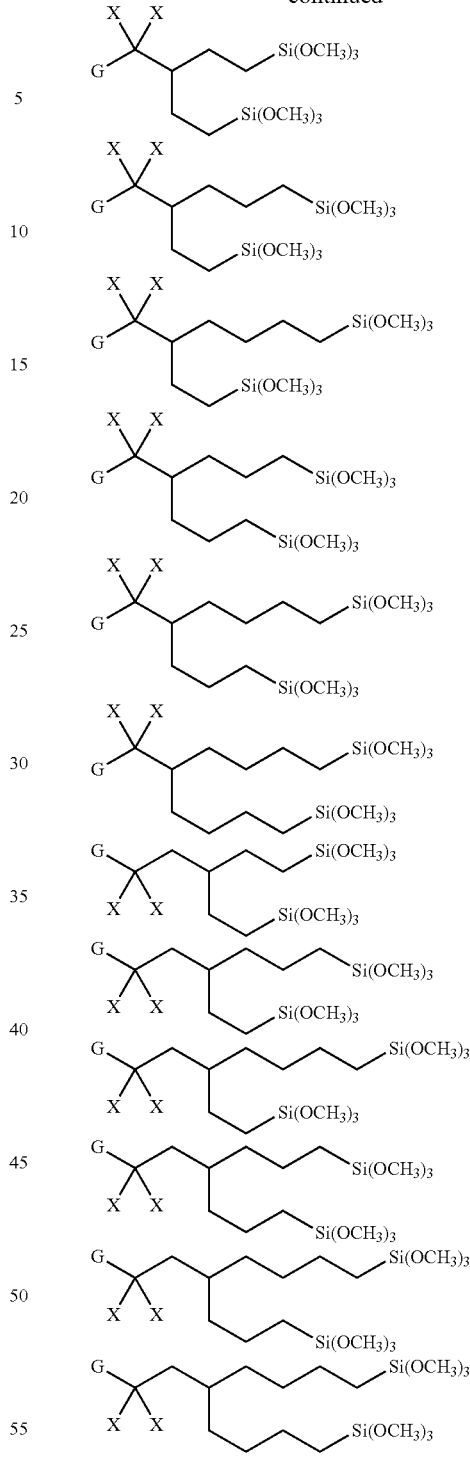

In the formulae, G is a group having a polyfluoropolyether chain. That is, G represents A-O—$(R^{f1}O)_m$—$(CF_2)_q$— in the above compounds 11 to 14. A preferred embodiment of G is the combination of the above preferred A, $(R^{f1}O)_m$ and q.

(Method for Producing Compound 1)

The compound 1 may be produced by a method of subjecting compound 2 represented by the following formula 2 and $HSiR^3{}_nL_{3-n}$ to hydrosilylation. Likewise, the compound 10 may be produced by a method of subjecting compound 20 represented by the following formula 20 and HSiR³$_n$L$_{3-n}$ to hydrosilylation.

A²-O—(R$^{f1}$O)$_m$—B²  formula 2 wherein A² is A or B², B² is a group represented by the following formula 2-1, Q$^{2a}$ is a single bond or an alkylene group, and two [-Q$^{2a}$-CH=CH₂] may be the same or different. -Q$^{2a}$-CH=CH₂ becomes Q² in the compound 1 after hydrosilylation.

—R$^{f2}$—[C(O)N(R¹)]$_p$-Q¹-C(R²)[-Q$^{2a}$-CH=CH₂]₂  formula 2-1

A-O—(R$^{f1}$O)$_m$—R$^{f2}$—[C(O)N(R¹)]$_p$-Q¹-C(R²)[-Q$^{2a}$-CH=CH₂]₂  formula 20

A, (R$^{f1}$O)$_m$, —R$^{f2}$—[C(O)N(R¹)]$_p$-Q¹- and R² are the same as A, (R$^{f1}$O)$_m$, —R$^{f2}$—[C(O)N(R¹)]$_p$-Q¹- and R² described for the compound 1, and the preferred embodiments are also the same.

Hereinafter the compound 20 wherein —R$^{f2}$—[C(O)N(R¹)]$_p$-Q¹- is the group g1 will be referred to as compound 21, the compound 20 wherein it is the group g2 as compound 22, the compound 20 wherein it is the group g3 as compound 23, and the compound 20 wherein it is the group g4 as compound 24.

A-O—(R$^{f1}$O)$_m$—(CF₂)$_q$—C(O)N(R¹)—(CH₂)$_r$C(R²)[-Q$^{2a}$-CH=CH₂]₂  formula 21

A-O—(R$^{f1}$O)$_m$—(CF₂)$_q$—CH₂CHX—(CH₂)$_r$—C(R²)[-Q$^{2a}$-CH=CH₂]₂  formula 22

A-O—(R$^{f1}$O)$_m$—(CF₂)$_q$—CX₂CH₂CX₂—(CH₂)$_r$—C(R²)[-Q$^{2a}$-CH=CH₂]₂  formula 23

A-O—(R$^{f1}$O)$_m$—(CF₂)$_q$—CX₂—(CH₂)$_r$—C(R²)[-Q$^{2a}$-CH=CH₂]₂  formula 24

The compounds 11 to 14 may be produced respectively by reacting the compounds 21 to 24 and HSiR³$_n$L$_{3-n}$ (hydrosilylation).

(Method for Producing Compound 2)

The compounds 21 to 24 may be produced by introducing a carbon-carbon unsaturated double bond to the terminal of compound 3 having an alkoxycarbonyl group or a carboxy group at its terminal or compound 4 having an iodine atom at its terminal.

A-O—(R$^{f1}$O)$_m$—(CF₂)$_q$—C(O)OR⁴  formula 3

A-O—(R$^{f1}$O)$_m$—(CF₂)$_q$—I  formula 4 wherein R⁴ is a hydrogen atom or a monovalent organic group, A and (R$^{f1}$O)$_m$ are the same as A and (R$^{f1}$O)$_m$ described for the compound 1, and the preferred embodiments are also the same. q is the same as q described for the compounds 11 to 14, and the preferred embodiment is also the same.

R⁴ is preferably an alkyl group. The number of carbon atoms in the alkyl group is preferably from 1 to 10, particularly preferably 1.

The compound 3 may be produced by the method disclosed in WO2009/008380, WO2013/121984, WO2013/121986, WO2015/087902, WO2017/038830, WO2017/038832 or the like.

The compound 4 may be produced by the method disclosed in WO2009/008380, WO2013/121984, WO2013/121986 or the like.

The compound 21 may be produced by a method of reacting the compound 3 and compound 51 (amidation).

NH(R¹)—(CH₂)$_r$—C(R²)[-Q$^{2a}$-CH=CH₂]₂  formula 51

R¹ and R² are the same as R¹ and R² described for the compound 1, and preferred embodiments are also the same. r is the same as r described for the compounds 11 and 14, and the preferred embodiment is also the same. Q$^{2a}$ is the same as Q$^{2a}$ described for the compound 2, and the preferred embodiment is also the same.

As the compound 51, for example, the following compounds may be mentioned.

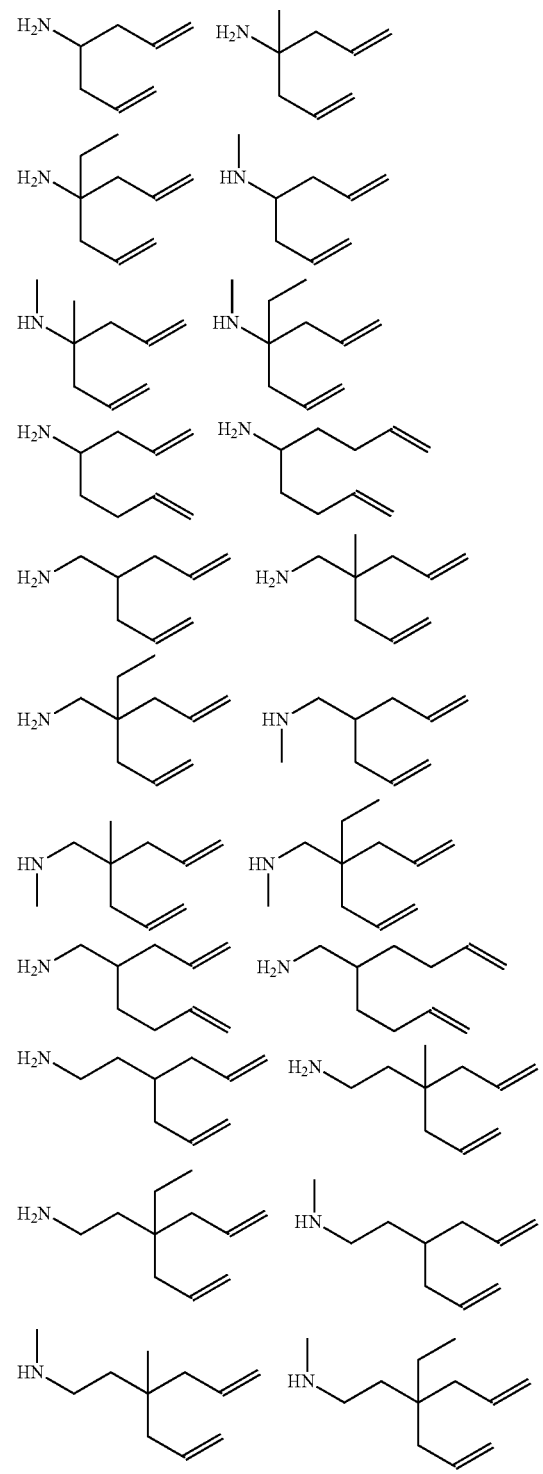

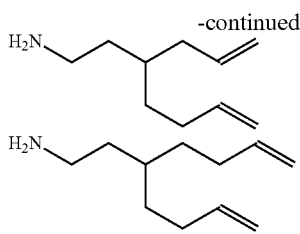

The compound 22 may be produced by reacting the compound 4 and compound 52 to obtain compound 62, and substituting the iodine atom in the compound 62 with a hydrogen atom or a fluorine atom, that is, by converting —CH$_2$CHI— to —CH$_2$CHX—.

$$CH_2=CH-(CH_2)_r-C(R^2)[-Q^{2a}-CH=CH_2]_2 \qquad \text{formula 52}$$

$$A-O-(R^{f1}O)_m-(CF_2)_q-CH_2CHI-(CH_2)_r-C(R^2)[-Q^{2a}-CH=CH_2]_2 \qquad \text{formula 62}$$

A, (R$^{f1}$O)$_m$ and R$^2$ are the same as A, (R$^{f1}$O)$_m$ and R$^2$ described for the compound 1, and the preferred embodiments are also the same. q and r are the same as q and r described for the compounds 11 to 14, and the preferred embodiments are also the same. Q$^{2a}$ is the same as Q$^{2a}$ described for the compound 2, and preferred embodiment is also the same.

As the compound 52, for example, the following compounds may be mentioned.

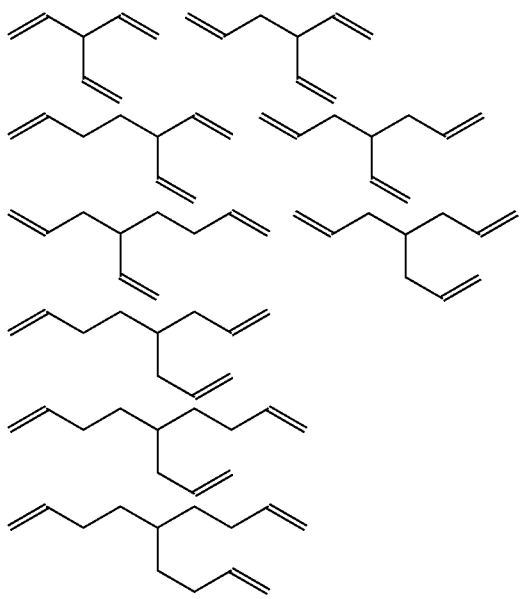

The compound 23 may be produced by reacting the compound 3 and compound 53 to obtain compound 63, and subjecting the carbonyl group in the compound 63 to hydrogen reduction or fluorination, that is, converting —C(O)— to —CX$_2$—.

$$CH_3-C(O)-(CH_2)_r-C(R^2)[-Q^{2a}-CH=CH_2]_2 \qquad \text{formula 53}$$

$$A-O-(R^{f1}O)_m-(CF_2)_q-C(O)CH_2C(O)-(CH_2)_r-C(R^2)[-Q^{2a}-CH=CH_2]_2 \qquad \text{formula 63}$$

A, (R$^{f1}$O)$_m$ and R$^2$ are the same as A, (R$^{f1}$O)$_m$ and R$^2$ described for the compound 1, and the preferred embodiments are also the same. q and r are the same as q and r described for the compounds 11 to 14, and the preferred embodiments are also the same. Q$^{2a}$ is the same as Q$^{2a}$ described for the compound 2, and the preferred embodiment is also the same.

As the compound 53, for example, the following compounds may be mentioned.

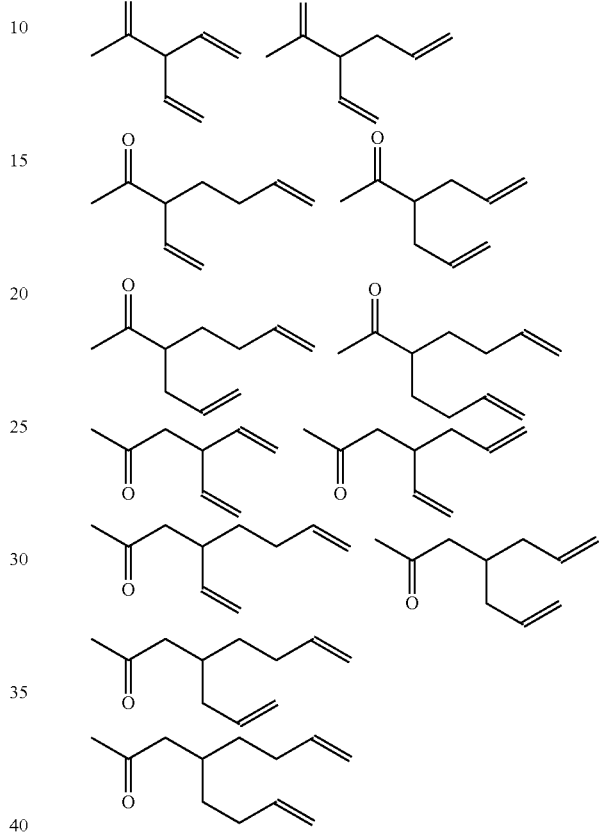

The compound 24 may be produced by reacting the compound 3 and compound 54 to obtain compound 64, and subjecting the carbonyl group in the compound 64 to hydrogen reduction or fluorination, that is, converting —C(O)— to —CX$_2$—.

$$Z-(CH_2)_r-C(R^2)[-Q^{2a}-CH=CH_2]_2 \qquad \text{formula 54}$$

$$A-O-(R^{f1}O)_m-(CF_2)_q-C(O)-(CH_2)_r-C(R^2)[-Q^{2a}-CH=CH_2]_2 \qquad \text{formula 64}$$

wherein Z is a chlorine atom, a bromine atom or an iodine atom. A, (R$^{f1}$O)$_m$ and R$^2$ are the same as A, (R$^{f1}$O)$_m$ and R$^2$ described for the compound 1, and the preferred embodiments are also the same. q and r are the same as q and r described for the compounds 11 to 14, and the preferred embodiments are also the same. Q$^{2a}$ is the same as Q$^{2a}$ described for the compound 2, and the preferred embodiment is also the same.

As the compound 54, for example, the following compounds may be mentioned.

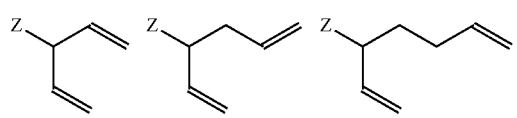

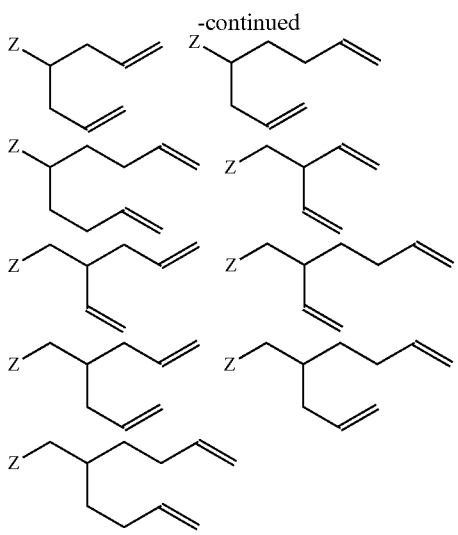

The above-described compound 10 is capable of forming a surface layer excellent in initial water/oil repellency, fingerprint stain removability, abrasion resistance, light resistance and chemical resistance, from the following reasons.

The compound 10, in which A has $CF_3$— at its terminal, has $CF_3$— at one terminal thereof, and has hydrolyzable silyl groups at the other end. According to the compound 10 having $CF_3$— at one terminal and hydrolyzable silyl groups at the other terminal, a surface layer having a low surface energy can be formed, which is excellent in lubricity and abrasion resistance. Whereas a surface layer formed of a fluorinated ether compound having a hydrolyzable silyl group at both terminals is insufficient in lubricity and abrasion resistance.

The compound 1 has $(R^{f1}O)_m$ and thereby has a high fluorine atom content. Accordingly, the compound 1 is capable of forming a surface layer excellent in initial water/oil repellency, abrasion resistance and fingerprint stain removability. Further, $(R^{f1}O)_m$ has a linear structure since $R^{f1}$ is a linear fluoroalkylene group. According to the compound 1 wherein $(R^{f1}O)_m$ has a linear structure, a surface layer excellent in abrasion resistance and lubricity can be formed. Whereas a surface layer formed of a fluorinated ether compound in which a poly(oxyperfluoroalkylene) chain has a branch is somewhat inferior in abrasion resistance and lubricity.

The compound 1, in which $R^{f2}$ is also a linear fluoroalkylene group, is capable of forming a surface layer excellent in abrasion resistance and lubricity.

The compound 1, in which $Q^1$ and $Q^2$ have no etheric oxygen atom, is capable of forming a surface layer excellent in light resistance and chemical resistance.

The compound 1 has two hydrolyzable silyl groups introduced via a branch by a carbon atom, does not have a bulky terminal on the hydrolyzable silyl groups side as compared with a fluorinated ether compound having three hydrolyzable silyl groups introduced via a branch by a carbon atom. Accordingly, the density of the compound 1 on the surface of the substrate is relatively high and as a result, the surface layer is excellent in abrasion resistance and light resistance.

The compound 1 further has the following effects.

The compound 1, which has two hydrolyzable silyl groups introduced via a branch by a carbon atom, is capable of forming a surface layer excellent in chemical resistance as compared with a fluorinated ether compound having two hydrolyzable silyl groups introduced via a branch by a nitrogen atom instead of a carbon atom.

The compound 1, in which $R^2$ is a hydrogen atom, a monovalent hydrocarbon group or a monovalent hydrocarbon group in which one or more hydrogen atoms are substituted by a halogen atom, is excellent in storage stability as compared with a fluorinated ether compound in which $R^2$ is a hydroxy group.

[Fluorinated Ether Composition]

The fluorinated ether composition of the present invention (hereinafter sometimes referred to as "the present composition") comprises at least one type of the compound 1 and other fluorinated ether compound.

As other fluorinated ether compound, a fluorinated ether compound formed as a by-product during production of the compound 1 (hereinafter sometimes referred to as "by-product fluorinated ether compound") and a known fluorinated ether compound used in the same applications as the compound 1 may, for example, be mentioned.

Other fluorinated ether compound is preferably one unlikely to impair the properties of the compound 1.

As the by-product fluorinated ether compound, unreacted compounds 2, 3 and 4, and fluorinated ether compounds formed through isomerization of some of the allyl groups into an inner olefin accompanying hydrosilylation during the production of the compound 1 may, for example, be mentioned.

As the known fluorinated ether compound, a commercially available fluorinated ether compound may, for example, be mentioned. In a case where the present composition contains a known fluorinated ether compound, it may have new effects such as compensation for the properties of the compound 1.

The content of the compound 1 is preferably at least 60 mass % and less than 100 mass %, more preferably at least 70 mass % and less than 100 mass %, particularly preferably at least 80 mass % and less than 100 mass % in the present composition.

The content of other fluorinated ether compound is preferably more than 0 mass % and at most 40 mass %, more preferably more than 0 mass % and at most 30 mass %, particularly preferably more than 0 mass % and at most 20 mass % in the present composition.

The total content of the compound 1 and other fluorinated ether compound is preferably from 80 to 100 mass %, particularly preferably from 85 to 100 mass % in the present composition.

When the content of the compound 1 and the content of other fluorinated ether compound are within the above ranges, the surface layer will be more excellent in initial water/oil repellency, abrasion resistance, fingerprint stain removability, light resistance and chemical resistance.

The present composition may contain a component other than the compound 1 and other fluorinated ether compound within a range not to impair the effects of the present invention.

Other component may, for example, be a by-product formed during production of the compound 1 or the known fluorinated ether compound (excluding the by-product fluorinated ether compound) or a compound inevitable in production such as an unreacted raw material.

Further, known additives such as an acid catalyst or a basic catalyst to promote hydrolysis and condensation reaction of the hydrolyzable silyl group may be mentioned. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide or ammonia.

The content of other component is preferably from 0 to 10 mass %, particularly preferably from 0 to 1 mass % in the present composition.

[Coating Liquid]

The coating liquid of the present invention (hereinafter sometimes referred to as "the present coating liquid") comprises the compound 1 or the present composition, and a liquid medium. The present coating liquid may be a solution or a dispersion.

The liquid medium is preferably an organic solvent. The organic solvent may be a fluorinated organic solvent, may be a non-fluorinated organic solvent, or may contain both solvents.

The fluorinated organic solvent may, for example, be a fluorinated alkane, a fluorinated aromatic compound, a fluoroalkyl ether, a fluorinated alkylamine, a fluoroalcohol, etc.

The fluorinated alkane is preferably a $C_{4-8}$ compound. Commercially available products may, for example, be $C_6F_{13}H$ (manufactured by Asahi Glass Company, Limited, ASAHIKLIN (registered trademark) AC-2000), $C_6F_{13}C_2H_5$ (manufactured by Asahi Glass Company, Limited, ASAHIKLIN (registered trademark) AC-6000), and $C_2F_5CHFCHFCF_3$ (manufactured by Chemours, Vertrel (registered trademark) XF).

The fluorinated aromatic compound may, for example, be hexafluorobenzene, trifluoromethylbenzene, perfluorotoluene or bis(trifluoromethyl)benzene.

The fluoroalkyl ether is preferably a $C_{1-4}$ compound. Commercially available products may, for example, be $CF_3CH_2OCF_2CF_2H$ (manufactured by Asahi Glass Company, Limited, ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200), and $C_2F_5CF(OCH_3)C_3F_7$ (manufactured by 3M, Novec (registered trademark) 7300).

The fluorinated alkylamine may, for example, be perfluorotripropylamine or perfluorotributylamine, The fluoroalcohol may, for example, be 2,2,3,3-tetrafluoropropanol, 2,2,2-trifluoroethanol or hexafluoroisopropanol.

The non-fluorinated organic solvent is preferably a compound consisting solely of hydrogen atoms and carbon atoms, or a compound consisting solely of hydrogen atoms, carbon atoms and oxygen atoms, and may be a hydrocarbon, an alcohol, a ketone, an ether, or an ester.

The liquid medium may be a mixed medium having two or more types mixed.

The content of the compound 1 or the present composition is preferably from 0.001 to 10 mass %, particularly preferably from 0.01 to 1 mass % in the present coating liquid.

The content of the liquid medium is preferably from 90 to 99.999 mass %, particularly preferably from 99 to 99.99 mass % in the present coating liquid.

[Article]

The article of the present invention (hereinafter sometimes referred to as "the present article" has a surface layer formed of the compound 1 or the present composition on the surface of a substrate.

The surface layer contains the compound 1 in a state where some or all of hydrolyzable silyl groups in the compound 1 are hydrolyzed and subjected to dehydration condensation reaction.

The thickness of the surface layer is preferably from 1 to 100 nm, particularly preferably from 1 to 50 nm. When the thickness of the surface layer is at least the lower limit value of the above range, the effect by the surface treatment is likely to be sufficiently obtained. When the thickness of the surface layer is at most the upper limit value of the above range, utilization efficiency will be high. The thickness of the surface layer can be calculated from an oscillation period of an interference pattern of reflected X-ray, obtained by X-ray reflectance method using an X-ray diffractometer for thin film analysis (manufactured by Rigaku Corporation, ATX-G).

The substrate may be a substrate which is desired to have water/oil repellency imparted. The material of the substrate may, for example, be a metal, a resin, glass, sapphire, ceramic, stone or a composite material thereof. The glass may be chemically tempered. The substrate may have a primer film such as a $SiO_2$ film formed on its surface.

As the substrate, a substrate for a touch panel, a substrate for display or a spectacle lens is preferred, and a substrate for a touch panel is particularly preferred. As the material of a substrate for a touch panel, glass or a transparent resin is preferred.

[Method for Producing Article]

The present article may be produced, for example, by the following method.

A method of treating the surface of a substrate by dry coating method using the compound 1 or the present composition, to form a surface layer formed of the compound 1 or the present composition on the surface of the substrate.

A method of applying the present coating liquid to the surface of a substrate by wet coating method, followed by drying to form a surface layer formed of the compound 1 or the present composition on the surface of the substrate.

As the dry coating method, a method such as vacuum deposition, CVD or sputtering may be mentioned. With a view to suppressing decomposition of the compound 1 and from the viewpoint of simplicity of apparatus, vacuum deposition method is preferred. At the time of vacuum deposition, a pelletized material having a metal porous product of iron, steel of the like impregnated with the compound 1 or the present composition may be used. A pelletized material impregnated with the compound 1 or the present composition, obtained by impregnating a metal porous product of iron, steel of the like with the present coating liquid and drying the liquid medium, may be used.

The wet coating method may, for example, be a spin coating method, a wipe coating method, a spray coating method, a squeegee coating method, a dip coating method, a die coating method, an ink-jet method, a flow coating method, a roll coating method, a casting method, a Langmuir-Blodgett method, or a gravure coating method.

EXAMPLES

Now, the present invention will be described in further detail with reference to Examples, but the present invention is not limited to these Examples. Hereinafter, "%" is "mass %" unless otherwise specified. Ex. 1 to 4 and 7 to 10 are Examples of the present invention, and Ex. 5, 6, 11 and 12 are Comparative Examples.

Ex. 1

Ex. 1-1

Compound 3-1 was obtained in accordance with the method disclosed in Example 6 of WO2013/121984.

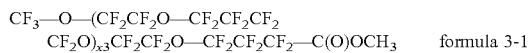
formula 3-1

NMR Spectrum of compound 3-1:
$^1$H-NMR (300.4 MHz, solvent: CDCl$_3$, reference: tetramethylsilane (TMS)) δ (ppm): 3.9 (3H).
$^{19}$F-NMR (282.7 MHz, solvent: CDCl$_3$, reference: CFCl$_3$) δ (ppm): −55 (3F), −82 (54F), −88 (54F), −90 (2F), −118 (2F), −125 (52F), −126 (2F).

Mean value of unit number x3: 13, number average molecular weight of compound 3-1: 4,740.

Ex. 1-2

Compound 51-1 was obtained by the method disclosed in Chemistry-A European Journal, Vol. 9, No. 19, 2003, pages 4796 to 4810 except that acetonitrile was used instead of propionitrile.

H$_2$N—CH$_2$—CH[—CH$_2$—CH=CH$_2$]$_2$    formula 51-1

Ex. 1-3

Into a 50 mL eggplant flask, 9.0 g of the compound 3-1 obtained in Ex. 1-1 and 0.34 g of the compound 51-1 obtained in Ex. 1-2 were put, followed by stirring for 12 hours. It was confirmed by NMR that the compound 3-1 was totally converted to compound 21-1. Further, methanol was formed as a by-product. The obtained solution was diluted with 9.0 g of AE-3000 and purified by silica gel column chromatography (developing solvent: AE-3000) to obtain 6.5 g (yield: 72%) of compound 21-1.

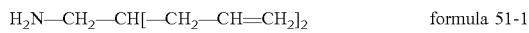
formula 21-1

NMR Spectrum of compound 21-1:
$^1$H-NMR (300.4 MHz, solvent: CDCl$_3$, reference: TMS) δ (ppm): 1.7 (1H), 2.1 (4H), 3.4 (2H), 5.2 (4H), 6.2 to 5.9 (2H).
$^{19}$F-NMR (282.7 MHz, solvent: CDCl$_3$, reference: CFCl$_3$) δ (ppm): −55 (3F), −82 (54F), −88 (54F), −90 (2F), −120 (2F), −125 (52F), −126 (2F).

Mean value of unit number x3: 13, number average molecular weight of compound 21-1: 4,830.

Ex. 1-4

Into a 10 mL sample tube made of a tetrafluoroethylene/perfluoro(alkoxyvinyl ether) copolymer (hereinafter sometimes referred to as "PFA"), 6.0 g of the compound 21-1 obtained in Ex. 1-3, 0.07 g of a xylene solution (platinum content: 2 mass %) of a platinum/1,3-divinyl-1,1,3,3-tetramethyldisiloxane complex, 0.78 g of HSi(OCH$_3$)$_3$, 0.02 g of aniline and 0.49 g of 1,3-bis(trifluoromethyl)benzene (manufactured by Tokyo Chemical Industry Co., Ltd.) were put, followed by stirring at 40° C. for 10 hours. After completion of the reaction, the solvent and the like were distilled off under reduced pressure, and the residue was subjected to filtration through a membrane filter having a pore size of 1.0 μm, to obtain 6.3 g (yield: 100%) of compound 11-1.

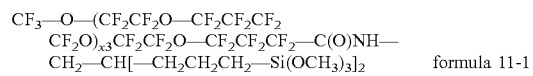
formula 11-1

NMR Spectrum of compound 11-1:
$^1$H-NMR (300.4 MHz, solvent: CDCl$_3$, reference: TMS) δ (ppm): 0.7 (4H), 1.3 to 1.7 (9H), 3.4 (2H), 3.6 (18H).
$^{19}$F-NMR (282.7 MHz, solvent: CDCl$_3$, reference: CFCl$_3$) δ (ppm): −55 (3F), −82 (54F), −81 (54F), −90 (2F), −120 (2F), −125 (52F), −126 (2F).

Mean value of unit number x3: 13, number average molecular weight of compound 11-1: 5,070.

Ex. 2

Ex. 2-1

Compound 3-2 was obtained in accordance with the method disclosed in Example 4 in WO2014/163004.

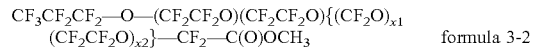
formula 3-2

NMR Spectrum of compound 3-2:
$^1$H-NMR (300.4 MHz, solvent: CDCl$_3$, reference: TMS) δ (ppm): 3.9 (3H).
$^{19}$F-NMR (282.7 MHz, solvent: CDCl$_3$, reference: CFCl$_3$) δ (ppm): −52 to −56 (42F), −78 (1F), −80 (1F), −82 (3F), −89 to −91 (92F), −131 (2F).

Mean value of unit number x1: 21, mean value of unit number x2: 20, number average molecular weight of compound 3-2: 4,230.

Ex. 2-2

6.5 g (yield: 79%) of compound 21-2 was obtained in the same manner as in Ex. 1-3 except that 9.0 g of the compound 3-1 was changed to 8.0 g of the compound 3-2 obtained in Ex. 2-1.

formula 21-2

NMR Spectrum of compound 21-2:
$^1$H-NMR (300.4 MHz, solvent: CDCl$_3$, reference: TMS) δ (ppm): 1.7 (1H), 2.1 (4H), 3.4 (2H), 5.2 (4H), 6.2 to 5.9 (2H).
$^{19}$F-NMR (282.7 MHz, solvent: CDCl$_3$, reference: CFCl$_3$) δ (ppm): −52 to −56 (42F), −79 (1F), −81 (1F), −82 (3F), −89 to −91 (92F), −131 (2F).

Mean value of unit number x1: 21, mean value of unit number x2: 20, number average molecular weight of compound 21-2: 4,330.

Ex. 2-3

5.7 g (yield: 100%) of compound 11-2 was obtained in the same manner as in Ex. 1-4 except that 6.0 g of the compound 21-1 was changed to 5.4 g of the compound 21-2 obtained in Ex. 2-2.

formula 11-2

NMR Spectrum of compound 11-2:
$^1$H-NMR (300.4 MHz, solvent: CDCl$_3$, reference: TMS) δ (ppm): 0.7 (4H), 1.3 to 1.7 (9H), 3.4 (2H), 3.7 (18H).

$^{19}$F-NMR (282.7 MHz, solvent: CDCl$_3$, reference: CFCl$_3$) δ (ppm): −52 to −56 (42F), −79 (1F), −81 (1F), −82 (3F), −89 to −91 (92F), −131 (2F).

Mean value of unit number x1: 21, mean value of unit number x2: 20, number average molecular weight of compound 11-2: 4,570.

Ex. 3

Ex. 3-1

Compound 51-2 was obtained in accordance with the method disclosed in Chemistry-A European Journal, Vol. 9, No. 19, 2003, pages 4796 to 4810.

H$_2$N—CH$_2$—C(CH$_3$)[—CH$_2$—CH=CH$_2$]$_2$    formula 51-2

Ex. 3-2

8.0 g (yield: 87%) of compound 21-3 was obtained in the same manner as in Ex. 1-3 except that 0.34 g of the compound 51-1 was changed to 0.37 g of the compound 51-2 obtained in Ex. 3-1.

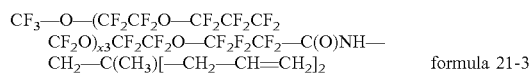

CF$_3$—O—(CF$_2$CF$_2$O—CF$_2$CF$_2$CF$_2$CF$_2$O)$_{x3}$CF$_2$CF$_2$O—CF$_2$F$_2$CF$_2$—C(O)NH—CH$_2$—C(CH$_3$)[—CH$_2$—CH=CH$_2$]$_2$    formula 21-3

NMR Spectrum of compound 21-3:
$^1$H-NMR (300.4 MHz, solvent: CDCl$_3$, reference: TMS) δ (ppm): 1.0 (3H), 2.1 (4H), 3.4 (2H), 5.2 (4H), 6.2 to 5.9 (2H).
$^{19}$F-NMR (282.7 MHz, solvent: CDCl$_3$, reference: CFCl$_3$) δ (ppm): −55 (3F), −82 (54F), −88 (54F), −90 (2F), −120 (2F), −125 (52F), −126 (2F).

Mean value of unit number x3: 13, number average molecular weight of compound 21-3: 4,850.

Ex. 3-3

6.3 g (yield: 100%) of compound 11-3 was obtained in the same manner as in Ex. 1-4 except that the compound 21-1 was changed to the compound 21-3 obtained in Ex. 3-2.

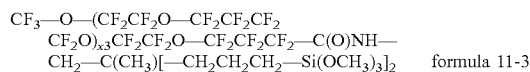

CF$_3$—O—(CF$_2$CF$_2$O—CF$_2$CF$_2$CF$_2$CF$_2$O)$_{x3}$CF$_2$CF$_2$O—CF$_2$CF$_2$CF$_2$—C(O)NH—CH$_2$—C(CH$_3$)[—CH$_2$CH$_2$CH$_2$—Si(OCH$_3$)$_3$]$_2$    formula 11-3

NMR Spectrum of compound 11-3:
$^1$H-NMR (300.4 MHz, solvent: CDCl$_3$, reference: TMS) δ (ppm): 0.7 (4H), 1.0 (3H), 1.4 to 1.6 (8H), 3.4 (2H), 3.6 (18H).
$^{19}$F-NMR (282.7 MHz, solvent: CDCl$_3$, reference: CFCl$_3$) δ (ppm): −55 (3F), −82 (54F), −81 (54F), −90 (2F), −120 (2F), −125 (52F), −126 (2F).

Mean value of unit number x3: 13, number average molecular weight of compound 11-3: 5,090.

Ex. 4

Ex. 4-1

7.8 g (yield: 95%) of compound 21-4 was obtained in the same manner as in Ex. 2-2 except that 0.34 g of the compound 51-1 was changed to 0.37 g of the compound 51-2 obtained in Ex. 3-1.

CF$_3$CF$_2$CF$_2$—O—(CF$_2$CF$_2$O)(CF$_2$CF$_2$O){(CF$_2$O)$_{x1}$(CF$_2$CF$_2$O)$_{x2}$}—CF$_2$—C(O)NH—CH$_2$—C(CH$_3$)[—CH$_2$CH=CH$_2$]$_2$    formula 21-4

NMR Spectrum of compound 21-4:
$^1$H-NMR (300.4 MHz, solvent: CDCl$_3$, reference: TMS) δ (ppm): 1.0 (3H), 2.1 (4H), 3.4 (2H), 5.2 (4H), 6.2 to 5.9 (2H).
$^{19}$F-NMR (282.7 MHz, solvent: CDCl$_3$, reference: CFCl$_3$) δ (ppm): −52 to −56 (42F), −79 (1F), −81 (1F), −82 (3F), −89 to −91 (92F), −131 (2F).

Mean value of unit number x1: 21, mean value of unit number x2: 20, number average molecular weight of compound 21-4: 4,340.

Ex. 4-2

6.3 g (yield: 99%) of compound 11-4 was obtained in the same manner as in Ex. 2-3 except that the compound 21-2 was changed to the compound 21-4 obtained in Ex. 4-1.

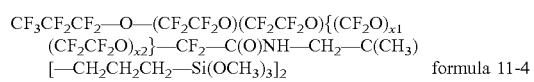

CF$_3$CF$_2$CF$_2$—O—(CF$_2$CF$_2$O)(CF$_2$CF$_2$O){(CF$_2$O)$_{x1}$(CF$_2$CF$_2$O)$_{x2}$}—CF$_2$—C(O)NH—CH$_2$—C(CH$_3$)[—CH$_2$CH$_2$CH$_2$—Si(OCH$_3$)$_3$]$_2$    formula 11-4

NMR Spectrum of compound 11-4:
$^1$H-NMR (300.4 MHz, solvent: CDCl$_3$, reference: TMS) δ (ppm): 0.7 (4H), 1.0 (3H), 1.4 to 1.6 (8H), 3.4 (2H), 3.6 (18H).
$^{19}$F-NMR (282.7 MHz, solvent: CDCl$_3$, reference: CFCl$_3$) δ (ppm): −52 to −56 (42F), −79 (1F), −81 (1F), −82 (3F), −89 to −91 (92F), −131 (2F).

Mean value of unit number x1: 21, mean value of unit number x2: 20, number average molecular weight of compound 11-4: 4,580.

Ex. 5

Ex. 5-1

Into a 50 mL eggplant flask, 5.0 g of tetrahydrofuran and 10 g of AE-3000 were put, and 5 mL of 0.7 mol/L allylmagnesium bromide was dropwise added. Further, 7.1 g of the compound 3-1 obtained in Ex. 1-1 was dropwise added, followed by stirring at 55° C. for 8 hours. The mixture was cooled to 25° C., 10 mL of a 1 mol/L aqueous hydrochloric acid solution was added to terminate the reaction, and the lower layer was purified by silica gel column chromatography (developing solvent: AE-3000) to obtain 6.5 g (yield: 72%) of compound 65-1.

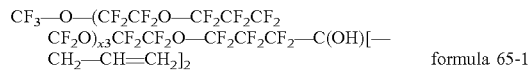

CF$_3$—O—(CF$_2$CF$_2$O—CF$_2$CF$_2$CF$_2$CF$_2$O)$_{x3}$CF$_2$CF$_2$O—CF$_2$CF$_2$CF$_2$—C(OH)[—CH$_2$—CH=CH$_2$]$_2$    formula 65-1

NMR Spectrum of compound 65-1:
$^1$H-NMR (300.4 MHz, solvent: CDCl$_3$, reference: TMS) δ (ppm): 2.4 to 2.6 (4H), 5.2 to 5.3 (4H), 5.9 to 6.0 (2H).
$^{19}$F-NMR (282.7 MHz, solvent: CDCl$_3$, reference: CFCl$_3$) δ (ppm): −55 (3F), −82 (54F), −88 (54F), −90 (2F), −116 (2F), −121 (2F), −125 (52F).

Mean value of unit number x3: 13, number average molecular weight of compound 65-1: 4,780.

Ex. 5-2

Into a 50 mL eggplant flask, 6.0 g of the compound 65-1 obtained in Ex. 5-1, 1.0 g of allyl bromide, 0.02 g of tetrabutylammonium iodide and 0.5 g of potassium hydroxide were put, followed by stirring at 80° C. for 5 hours. The mixture was cooled to 25° C., 10 g of AE-3000 was put, and the mixture was washed with water twice. The obtained crude liquid was purified by silica gel column chromatography (developing solvent: AC-6000) to obtain 5.5 g (yield: 91%) of compound 25-1.

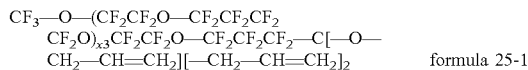
formula 25-1

NMR Spectrum of compound 25-1:
$^1$H-NMR (300.4 MHz, solvent: CDCl$_3$, reference: TMS) δ (ppm): 2.6 to 2.7 (4H), 4.1 (2H), 5.0 to 5.3 (6H), 5.7 to 5.9 (3H).
$^{19}$F-NMR (282.7 MHz, solvent: CDCl$_3$, reference: CFCl$_3$) δ (ppm): −55 (3F), −82 (54F), −88 (54F), −90 (2F), −111 (2F), −123 (2F), −125 (52F).

Mean value of unit number x3: 13, number average molecular weight of compound 25-1: 4,820.

Ex. 5-3

5.2 g (yield: 99%) of compound 15-1 was obtained in the same manner as in Ex. 1-4 except that 6.0 g of the compound 21-1 was changed to 5.0 g of the compound 25-1 obtained in Ex. 5-2.

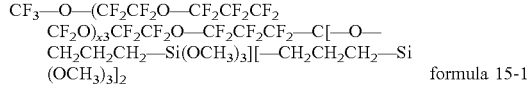
formula 15-1

NMR Spectrum of compound 15-1:
$^1$H-NMR (300.4 MHz, solvent: CDCl$_3$, reference: TMS) δ (ppm): 0.6 to 0.8 (6H), 1.6 to 1.8 (6H), 1.9 to 2.0 (4H), 3.6 (29H).
$^{19}$F-NMR (282.7 MHz, solvent: CDCl$_3$, reference: CFCl$_3$) δ (ppm): −55 (3F), −82 (54F), −88 (54F), −90 (2F), −120 (2F), −125 (52F), −126 (2F).

Mean value of unit number x3: 13, number average molecular weight of compound 15-1: 5,180.

Ex. 6

Ex. 6-1

5.8 g (yield: 90%) of compound 65-2 was obtained in the same manner as in Ex. 5-1 except that 7.1 g of the compound 3-1 was changed to 6.4 g of the compound 3-2 obtained in Ex. 2-1.

formula 65-2

NMR Spectrum of compound 65-2:
$^1$H-NMR (300.4 MHz, solvent: CDCl$_3$, reference: TMS) δ (ppm): 2.4 to 2.6 (4H), 5.2 to 5.3 (4H), 5.9 to 6.0 (2H).
$^{19}$F-NMR (282.7 MHz, solvent: CDCl$_3$, reference: CFCl$_3$) δ (ppm): −52 to −56 (42F), −77 (1F), −81 (1F), −82 (3F), −89 to −91 (92F), −131 (2F).

Mean value of unit number x1: 21, mean value of unit number x2: 20, number average molecular weight of compound 65-2: 4,280.

Ex. 6-2

5.1 g of (yield: 90%) of compound 25-2 was obtained in the same manner as in Ex. 5-2 except that 6.0 g of the compound 65-1 was changed to 5.5 g of the compound 65-2 obtained in Ex. 6-1.

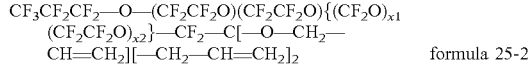
formula 25-2

NMR Spectrum of compound 25-2:
$^1$H-NMR (300.4 MHz, solvent: CDCl$_3$, reference: TMS) δ (ppm): 2.5 to 2.6 (4H), 4.1 (2H), 4.9 to 5.2 (6H), 5.7 to 5.9 (3H).
$^{19}$F-NMR (282.7 MHz, solvent: CDCl$_3$, reference: CFCl$_3$) δ (ppm): −52 to −56 (42F), −76 (1F), −78 (1F), −82 (3F), −89 to −91 (92F), −131 (2F).

Mean value of unit number x1: 21, mean value of unit number x2: 20, number average molecular weight of compound 25-2: 4,320.

Ex. 6-3

5.3 g (yield: 100%) of compound 15-2 was obtained in the same manner as in Ex. 1-4 except that 6.0 g of the compound 21-1 was changed to 5.0 g of the compound 25-2 obtained in Ex. 6-2.

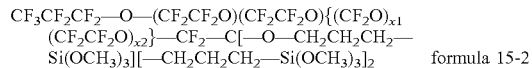
formula 15-2

NMR Spectrum of compound 15-2:
$^1$H-NMR (300.4 MHz, solvent: CDCl$_3$, reference: TMS) δ (ppm): 0.6 to 0.8 (6H), 1.6 to 1.8 (6H), 1.9 to 2.0 (4H), 3.6 (29H).
$^{19}$F-NMR (282.7 MHz, solvent: CDCl$_3$, reference: CFCl$_3$) δ (ppm): −52 to −56 (42F), −76 (1F), −78 (1F), −82 (3F), −89 to −91 (92F), −131 (2F).

Mean value of unit number x1: 21, Mean value of unit number x2: 20, number average molecular weight of compound 15-2: 4,690.

Ex. 7 to 12: Production and Evaluation of Article

Using the compound obtained in each of Ex. 1 to 6, a substrate was surface-treated to obtain an article in each of Ex. 7 to 12. As the surface treatment method, in each Ex., the following dry coating and wet coating method were respectively employed. As the substrate, chemically tempered glass was used. With respect to the obtained article, evaluations were carried out by the following methods. The results are shown in Table 1.

(Dry Coating Method)

The dry coating was carried out by using a vacuum deposition apparatus (manufactured by ULVAC Co., VTR-350M) (vacuum deposition method). 0.5 g of the compound obtained in each of Ex. 1 to 6 was filled in a boat made of molybdenum in the vacuum deposition apparatus, and inside of the vacuum deposition apparatus was evacuated to a level of at most 1×10$^{-3}$ Pa. The boat having the compound placed therein, was heated at a temperature raising rate of at most 10° C./min, and at the time when the vapor deposition rate by a quartz oscillator film thickness meter exceeded 1 nm/sec, the shutter was opened to initiate film deposition on the surface of a substrate. When the film thickness became about 50 nm, the shutter was closed to terminate film deposition on the surface of the substrate. The substrate on which the compound was deposited, was subjected to heat treatment at 200° C. for 30 minutes, followed by washing with dichloropentafluoropropane (manufactured by Asahi Glass Company, Limited, AK-225), to obtain an article having a surface layer on the surface of the substrate.

(Wet Coating Method)

The compound obtained in each of Ex. 1 to 6, and C$_4$F$_9$OC$_2$H$_5$ (manufactured by 3M, Novec (registered trademark) 7200) as a medium, were mixed to prepare a coating liquid having a solid content concentration of 0.05%. A substrate was dipped in the coating liquid and allowed to stand for 30 minutes, whereupon the substrate was taken out (dip coating method). The coating film was dried at 200° C. for 30 minutes and washed with AK-225, to obtain an article having a surface layer on the surface of the substrate.

(Evaluation Methods)

<Method for Measuring Contact Angle>

The contact angle of about 2 μL of distilled water or n-hexadecane placed on the surface of the surface layer, was measured by using a contact angle measuring apparatus (manufactured by Kyowa Interface Science Co., Ltd., DM-500). Measurements were conducted at five different points on the surface of the surface layer, and the average value was calculated. For the calculation of the contact angle, a 2θ method was employed.

<Initial Contact Angle>

With respect to the surface layer, the initial water contact angle and the initial n-hexadecane contact angle were measured by the above-described measuring method. The evaluation standards are as follows.

Initial water contact angle:

⊚ (excellent): at least 115 degrees.

○ (good): at least 110 degrees and less than 115 degrees.

Δ (acceptable): at least 100 degrees and less than 110 degrees.

× (poor): less than 100 degrees.

Initial n-hexadecane contact angle:

⊚ (excellent): at least 66 degrees.

○ (good): at least 65 degrees and less than 66 degrees.

Δ (acceptable): at least 63 degrees and less than 65 degrees.

× (poor): less than 63 degrees.

<Abrasion Resistance (Steel Wool)>

With respect to the surface layer, in accordance with JIS L0849: 2013 (ISO 105-X12: 2001), using a reciprocating traverse testing machine (manufactured by KNT Co.), steel wool Bon Star (#0000) was reciprocated 10,000 times under a pressure of 98.07 kPa at a speed of 320 cm/min, whereupon the water contact angle was measured. The smaller the decrease in water repellency (water contact angle) after the friction, the smaller the decrease in performance due to friction, and the better the abrasion resistance. The evaluation standards are as follows.

⊚ (excellent): The change in water contact angle after reciprocation of 10,000 times is at most 2 degrees.

○ (good): The change in water contact angle after reciprocation of 10,000 times is more than 2 degrees and at most 5 degrees.

Δ (acceptable): The change in water contact angle after reciprocation of 10,000 times is more than 5 degrees and at most 10 degrees.

× (poor): The change in water contact angle after reciprocation of 10,000 times is more than 10 degrees.

<Abrasion Resistance (Eraser)>

With respect to the surface layer, in accordance with JIS L0849: 2013 (ISO 105-X12: 2001), using a reciprocating traverse testing machine (manufactured by KNT Co.), Rubber Eraser (manufactured by Minoan) was reciprocated 30,000 times under a load of 4.9 N at a speed of 60 rpm, whereupon the water contact angle was measured. The smaller the decrease in water repellency (water contact angle) after the friction, the smaller the decrease in performance due to friction, and the better the abrasion resistance. The evaluation standards are as follows.

⊚ (excellent): The change in water contact angle after reciprocation of 10,000 times is at most 2 degrees.

○ (good): The change in water contact angle after reciprocation of 10,000 times is more than 2 degrees and at most 5 degrees.

Δ (acceptable): The change in water contact angle after reciprocation of 10,000 times is more than 5 degrees and at most 10 degrees.

× (poor): The change in water contact angle after reciprocation of 10,000 times is more than 10 degrees.

<Fingerprint Stain Removability>

An artificial fingerprint liquid (liquid consisting of oleic acid and squalene) was deposited on a flat surface of a silicon rubber plug, and then, extra oil was wiped off by a nonwoven fabric (manufactured by Asahi Kasei Corporation, BEMCOT (registered trademark) M-3), to prepare a stamp for fingerprint. The fingerprint stamp was placed on the surface layer and pressed under a load of 9.8 N for 10 seconds. The haze at a portion having a fingerprint put, was measured by a haze meter and taken as an initial value. With respect to the portion having a fingerprint put, using a reciprocating traverse testing machine (manufactured by KNT Co.) having tissue paper attached, wiping was carried out under a load of 4.9 N. The value of haze was measured every one reciprocation for wiping, and the number of wiping times until the haze became at most 10% of the initial value, was measured. The smaller the number of wiping times, the easier the removal of fingerprint stain, and the better the fingerprint stain removability. The evaluation standards are as follows.

⊚ (excellent): The number of wiping times is at most 3 times.

○ (good): The number of wiping times is from 4 to 5 times.

Δ (acceptable): The number of wiping times is from 6 to 8 times.

× (poor): The number of wiping times is at least 9 times.

<Light Resistance>

To the surface layer, by means of a tabletop xenon arc lamp type accelerated light resistance testing machine (manufactured by Toyo Seiki Seisaku-sho, Ltd., SUNTEST XLS+), light (650 W/m$^2$, 300 to 700 nm) was applied at a black panel temperature of 63° C. for 1,000 hours, whereupon the water contact angle was measured. The smaller the decrease in water contact angle after the accelerated light resistance test, the smaller the decrease in performance due to light, and the better the light resistance. The evaluation standards are as follows.

⊚ (excellent): The change in water contact angle after the accelerated light resistance test is at most 2 degrees.

○ (good): The change in water contact angle after the accelerated light resistance test is more than 2 degrees and at most 5 degrees.

Δ (acceptable): The change in water contact angle after the accelerated light resistance test is more than 5 degrees and at most 10 degrees.

× (poor): The change in water contact angle after the accelerated light resistance test is more than 10 degrees.

<Lubricity>

The dynamic friction coefficient of the surface layer to an artificial skin (manufactured by Idemitsu Technofine Co., Ltd., PBZ13001) was measured by means of a load variation type friction abrasion test system (manufactured by Shinto Scientific Co., Ltd., HHS2000) under conditions of a contact area of 3 cm×3 cm and a load of 0.98N. The smaller the dynamic friction coefficient, the better the lubricity. The evaluation standards are as follows.

⊚ (excellent): The dynamic friction coefficient is at most 0.2.
○ (good): The dynamic friction coefficient is more than 0.2 and at most 0.3.
Δ (acceptable): The dynamic friction coefficient is more than 0.3 and at most 0.4.
× (poor): The dynamic friction coefficient is more than 0.4.

<Chemical Resistance (Alkali Resistance)>

The article was immersed in a 1N aqueous sodium hydroxide solution (pH: 14) for 5 hours, then washed with water and air-dried, whereupon the water contact angle was measured. The smaller the decrease in water contact angle after the test, the smaller the decrease in performance due to alkali, and the better the alkali resistance. The evaluation standards are as follows.

⊚ (excellent): The change in water contact angle after the alkali resistance test is at most 2 degrees.
○ (good): The change in water contact angle after the alkali resistance test is more than 2 degrees and at most 5 degrees.
Δ (acceptable): The change in water contact angle after the alkali resistance test is more than 5 degrees and at most 10 degrees.
× (poor): The change in water contact angle after the alkali resistance test is more than 10 degrees.

<Chemical Resistance (Salt Water Resistance)>

The salt spray test was carried out in accordance with JIS H8502. That is, the article was exposed to salt atmosphere in a salt spray tester (manufactured by Suga Test Instruments Co., Ltd.) for 300 hours, and then, the water contact angle was measured. The smaller the decrease in water contact angle after the test, the smaller the decrease in performance due to salt water, and the better the salt water resistance. The evaluation standards are as follows.

⊚ (excellent): The change in water contact angle after the salt spray test is at most 2 degrees.
○ (good): The change in water contact angle after the salt spray test is more than 2 degrees and at most 5 degrees.
Δ (acceptable): The change in water contact angle after the salt spray test is more than 5 degrees and at most 10 degrees.
× (poor): The change in water contact angle after the salt spray test is more than 10 degrees.

It was confirmed that in Ex. 7 to 10 in which the compound 1 was used, the initial water/oil repellency, abrasion resistance, fingerprint stain removability, light resistance and chemical resistance were excellent.

In Ex. 11 and 12 in which the compounds of Ex. 7 and 8 corresponding to the fluorinated ether compound disclosed in Patent Document 1 were used, abrasion resistance, light resistance and chemical resistance were inferior.

INDUSTRIAL APPLICABILITY

The fluorinated ether compound of the present invention is useful for various applications for which it is required to impart lubricity and water/oil repellency. For example, it may be used for a display input device such as a touch panel, surface protective coating on a transparent glass or transparent plastic member, kitchen antifouling coating, water repellent moistureproof coating or antifouling coating on electronic device, a heat exchanger or a battery, toiletry antifouling coating, coating on a member which requires liquid repellency while conducting electricity, water repellent/waterproof/water sliding coating on a heat exchanger, or a surface low friction coating on the inside of a vibrating strainer or a cylinder, etc. More specific examples of application include a front protective plate, an antireflection plate, a polarizing plate, an antiglare plate or a surface thereof having an antireflection film, of a display, an apparatus having a display input device of which the screen is operated by human fingers or hands, such as a touch panel sheet or a touch panel display of an apparatus such as a mobile phone or a personal digital assistant, a decorative building material for restroom, bathroom, lavatory, kitchen and the like, waterproof coating for a wiring board, water repellent/waterproof coating on a heat exchanger, water repellent coating on a solar cell, waterproof/water repellent coating on a printed wiring board, waterproof/water repellent coating for an electronic equipment casing or an electronic member, insulating property-improving coating on a power transmission line, waterproof/water repellent coating on a filter, waterproof coating on an electromagnetic wave absorption material or an acoustic material, antifouling coating for bathroom, kitchen instrument and toiletry, water repellent/waterproof/water sliding coating on a heat exchanger, surface low-friction coating on the inside of a vibrating strainer

TABLE 1

| | Ex. | 7 Compound (11-1) | 8 Compound (11-2) | 9 Compound (11-3) | 10 Compound (11-4) | 11 Compound (15-1) | 12 Compound (15-2) |
|---|---|---|---|---|---|---|---|
| | Fluorinated ether compound | | | | | | |
| Dry coating method | Initial contact angle  water | ⊚ | ⊚ | ⊚ | ⊚ | ⊚ | ⊚ |
| | n-Hexadecane | ⊚ | ⊚ | ⊚ | ⊚ | ⊚ | ⊚ |
| | Abrasion resistance (steel wool) | ⊚ | ○ | ⊚ | ○ | Δ | Δ |
| | Abrasion resistance (eraser) | ○ | ○ | ○ | ○ | Δ | Δ |
| | Fingerprint stain removability | ⊚ | ⊚ | ⊚ | ⊚ | ⊚ | ⊚ |
| | Light resistance | ○ | Δ | ○ | Δ | × | × |
| | Lubricity | Δ | ⊚ | Δ | ⊚ | Δ | ⊚ |
| | Chemical resistance (alkali resistance) | ○ | ○ | ○ | ○ | Δ | × |
| | Chemical resistance (salt water resistance) | ⊚ | ⊚ | ⊚ | ⊚ | Δ | Δ |
| wet coating method | Initial contact angle  water | ⊚ | ⊚ | ⊚ | ⊚ | ⊚ | ⊚ |
| | n-Hexadecane | ⊚ | ⊚ | ⊚ | ⊚ | ⊚ | ⊚ |
| | Abrasion resistance (steel wool) | ⊚ | ○ | ⊚ | Δ | Δ | Δ |
| | Abrasion resistance (eraser) | ○ | ○ | ○ | ○ | × | × |
| | Fingerprint stain removability | ⊚ | ⊚ | ⊚ | ⊚ | ⊚ | ⊚ |
| | Light resistance | ○ | Δ | ○ | Δ | × | × |
| | Lubricity | Δ | ⊚ | Δ | ⊚ | Δ | ⊚ |
| | Chemical resistance (alkali resistance) | ○ | ○ | ○ | ○ | Δ | × |
| | Chemical resistance (salt water resistance) | ⊚ | ⊚ | ⊚ | ⊚ | Δ | Δ | or a cylinder, surface protective coating on a machine component, a vacuum apparatus component, a bearing component, an automobile component, an industrial tool, etc.

What is claimed is:

1. A fluorinated ether compound, which is a compound represented by the following formula 1:

  formula 1 wherein $A^1$ is a $C_{1\text{-}20}$ perfluoroalkyl group or $B^1$,
$R^{f1}$ is a linear fluoroalkylene group,
m is an integer of from 2 to 500,
$(R^{f1}O)_m$ may consist of two or more types of $R^{f1}O$ differing in the number of carbon atoms,
$B^1$ is a group represented by the following formula 1-1:

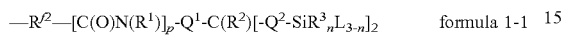  formula 1-1

$R^{f2}$ is a linear fluoroalkylene group (provided that to a carbon atom at the terminal on the $[C(O)N(R^1)]_p$ side, at least one fluorine atom is bonded),
$R^1$ is a hydrogen atom or an alkyl group,
p is 0 or 1,
$Q^1$ is a single bond or an alkylene group,
$R^2$ is a hydrogen atom, a monovalent hydrocarbon group, or a monovalent hydrocarbon group in which one or more hydrogen atoms are substituted by a halogen atom,
$Q^2$ is an alkylene group,
$R^3$ is a hydrogen atom or a monovalent hydrocarbon group,
L is a hydrolyzable group,
n is an integer of from 0 to 2, and
the two $[-Q^2-SiR^3{}_nL_{3-n}]$ may be the same or different.

2. The fluorinated ether compound according to claim 1, wherein the compound represented by the formula 1 is a compound represented by the following formula 10:

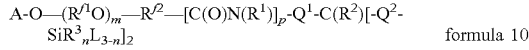  formula 10 wherein A is a $C_{1\text{-}20}$ perfluoroalkyl group.

3. The fluorinated ether compound according to claim 1, wherein in the group represented by the formula 1-1, $-R^{f2}-[C(O)N(R^1)]_p-Q^1-$ is a group represented by the following formula g1, g2, g3 or g4:

  formula g1

  formula g2

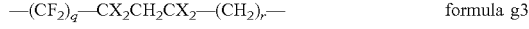  formula g3

  formula g4 wherein X is a hydrogen atom or a fluorine atom, all the four X in the formula g3 are the same atom, all the two X in the formula g4 are the same atom, q is an integer of from 1 to 5, and r is an integer of from 0 to 2.

4. The fluorinated ether compound according to claim 1, wherein the compound represented by the formula 1 is a compound represented by the following formula 11, 12, 13 or 14:

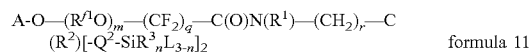  formula 11

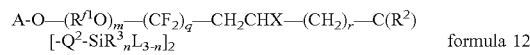  formula 12

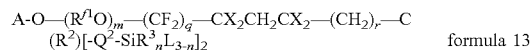  formula 13

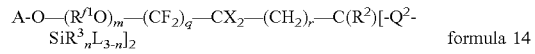  formula 14 wherein A is a $C_{1\text{-}20}$ perfluoroalkyl group, X is a hydrogen atom or a fluorine atom, all the four X in the formula 13 are the same atom, all the two X in the formula 14 are the same atom, q is an integer of from 1 to 5, and r is an integer of from 0 to 2.

5. The fluorinated ether compound according to claim 1, wherein $R^{f1}$ is a perfluoroalkylene group.

6. A fluorinated ether composition comprising at least one type of the fluorinated ether compound as defined in claim 1, and other fluorinated ether compound.

7. A coating liquid comprising the fluorinated ether compound as defined in claim 1, and a liquid medium.

8. A method for producing an article, which comprises applying the coating liquid as defined in claim 7 to a surface of a substrate by wet coating method, followed by drying to form a surface layer formed of the fluorinated ether compound on the surface of the substrate.

9. An article comprising a substrate and a surface layer formed of the fluorinated ether compound as defined in claim 1 on a surface of the substrate.

10. The article according to claim 9, which has the surface layer on a surface of a member constituting a plane to be touched with fingers of a touch panel.

11. A method for producing an article, which comprises treating a surface of a substrate by dry coating method using the fluorinated ether compound as defined in claim 1 to form a surface layer formed of the fluorinated ether compound on the surface of the substrate.

* * * * *